United States Patent
Whitcher et al.

(10) Patent No.: US 10,691,581 B1
(45) Date of Patent: Jun. 23, 2020

(54) DISTRIBUTED SOFTWARE DEBUGGING SYSTEM

(71) Applicant: SAS Institute Inc., Cary, NC (US)

(72) Inventors: Michael Stephen Whitcher, Apex, NC (US); Aaron Samuel Mays, Cary, NC (US); Ryan Richard Albert, Cary, NC (US); Gerald Lee Haden, Durham, NC (US)

(73) Assignee: SAS INSTITUTE INC., Cary, NC (US)

(*) Notice: Subject to any disclaimer, the term of this patent is extended or adjusted under 35 U.S.C. 154(b) by 0 days.

(21) Appl. No.: 16/802,781

(22) Filed: Feb. 27, 2020

Related U.S. Application Data

(60) Provisional application No. 62/888,219, filed on Aug. 16, 2019, provisional application No. 62/928,785, filed on Oct. 31, 2019, provisional application No. 62/959,265, filed on Jan. 10, 2020.

(51) Int. Cl.
  *G06F 11/36* (2006.01)
  *H04L 29/06* (2006.01)
(52) U.S. Cl.
  CPC ...... *G06F 11/3664* (2013.01); *G06F 11/3688* (2013.01); *H04L 63/083* (2013.01)
(58) Field of Classification Search
  CPC . G06F 11/3664; G06F 11/3688; H04L 63/083
  See application file for complete search history.

(56) References Cited

U.S. PATENT DOCUMENTS

| | | | |
|---|---|---|---|
| 8,856,742 B2 | 10/2014 | Branda et al. | |
| 2005/0216895 A1 | 9/2005 | Tran | |
| 2007/0016959 A1* | 1/2007 | Ikeda | G06F 21/31 726/27 |

(Continued)

FOREIGN PATENT DOCUMENTS

| | | |
|---|---|---|
| EP | 0730227 | 6/2002 |
| WO | WO2011/131469 | 10/2011 |

OTHER PUBLICATIONS

PGI Compilers & tools Debugger User's Guide Version 2019, NVIDIA Corporation, 2019, 137 pages.

(Continued)

*Primary Examiner* — Viva Miller
(74) *Attorney, Agent, or Firm* — Bell & Manning, LLC

(57) ABSTRACT

A connection request is received from a debug UI by a middle tier instance through a first predefined computer port. A connection data request is received from the debug UI by the middle tier instance. Connection data for a debug engine is sent from the middle tier instance to the debug UI and provided to the debug engine from the debug UI. The connection data includes a second predefined computer port of the first computing device. An initial packet is received by the middle tier instance from the debug engine through the second predefined computer port. A unique engine identifier is defined for the debug engine by the middle tier instance and an engine connection confirmation is sent from the middle tier instance to the debug UI indicating that a connection with the debug engine has been established and including the unique engine identifier for the debug engine.

30 Claims, 18 Drawing Sheets

(56) References Cited

U.S. PATENT DOCUMENTS

| | | | | |
|---|---|---|---|---|
| 2010/0263043 A1* | 10/2010 | Xu | ................... | G06F 11/26 |
| | | | | 726/17 |
| 2015/0033078 A1* | 1/2015 | Wintergerst | .......... | G06F 11/362 |
| | | | | 714/38.1 |
| 2018/0239692 A1* | 8/2018 | Kalyanasundram | .. | G06F 11/263 |
| 2019/0227908 A1 | 7/2019 | Munafo et al. | | |

OTHER PUBLICATIONS

PGI Debugger User's Guide, Version 2017, 2017, 134 pages.

The GDB/MI Interface from Debugging with GDB: GDB/MI, 2 pages, printed from the internet Sep. 19, 2019.

Kayce Basques, "Get Started with Debugging JavaScript in Chrome DevTools", https://developers.google.com/web/tools/chrome-devtools/javascript/, 14 pages printed from the internet Sep. 19, 2019.

Quickstart: First look at profiling tools—Visual Studio Microsoft Docs, https://docs.microsoft.com/en-us/visualstudio/profiling-feature-tour?view=vs-2019, printed from the internet Sep. 19, 2019, 13 pages.

Pong-tamu-edu.pdf: pong.tamu.edu/~baum/linuxlist/tempo/node44.html, 13 pages, printed from the internet Sep. 19, 2019, last modified Oct. 3, 1997.

Rogue Wave Software Version 8.15.7, Totalview Getting Started Guide, 2015, 41 pages.

TotalView for HPC—Memory Optimization & Dynamic Visualization, Rogue Wave, https://www.roguewave.com/products-services/totalview, printed from the internet 2019, 9 pages.

Debug multithreaded applications in Visual Studio, Microsoft Visual Studio Docs, Nov. 6, 2018.

Debugging threaded Codes, https://computing.llnl.gov/tutorials/totalview/part3.html#PthreadsDebug, last modified Sep. 3, 2019.

Debugging in Coherence https://docs.oracle.com/cd/E24290_01/coh.371/e22837/gs_debug.htm#COHDG5546:, copyright 2011, Oracle, printed from the internet Sep. 19, 2019.

Debugging your programs http://docs.activestate.com/komodo/11/manual/debugger.html, 2019.

Debugger, https://nuclide.io/docs/features/debugger/, printed from the internet Sep. 19, 2019.

A Practical Guide to Java Remote Debugging, Eugen Paraschiv, https://stackify.com/java-remote-debugging/, Dec. 7, 2017.

Multi-language debuggers, https://stackoverflow.com/questions/33289105/multi-language-debuggers, printed from the internet Sep. 19, 2019.

Remote Debugging, https://docs.microsoft.com/en-us/visualstudio/debugger/remote-debugging?view=vs-2019 Jul. 2, 2018, Microsoft Visual Studio Docs.

Python debug configurations in Visual Studio Code, https://code.visualstudio.com/docs/python/debugging, printed from the internet Sep. 19, 2019.

Application program debugging, https://www.ibm.com/support/knowledgecenter/en/SSAL2T_8.1.0/com.ibm.cics.tx.doc/concept/c_app_prgrm_debugging.html, printed from the internet Sep. 19, 2019.

https://dzone.com/articles/parallel-tcpip-socket-server-with-multi-threading: parallel TCP/IP socket server with multithreading and multiprocessing in C, Apr. 10, 2018.

* cited by examiner

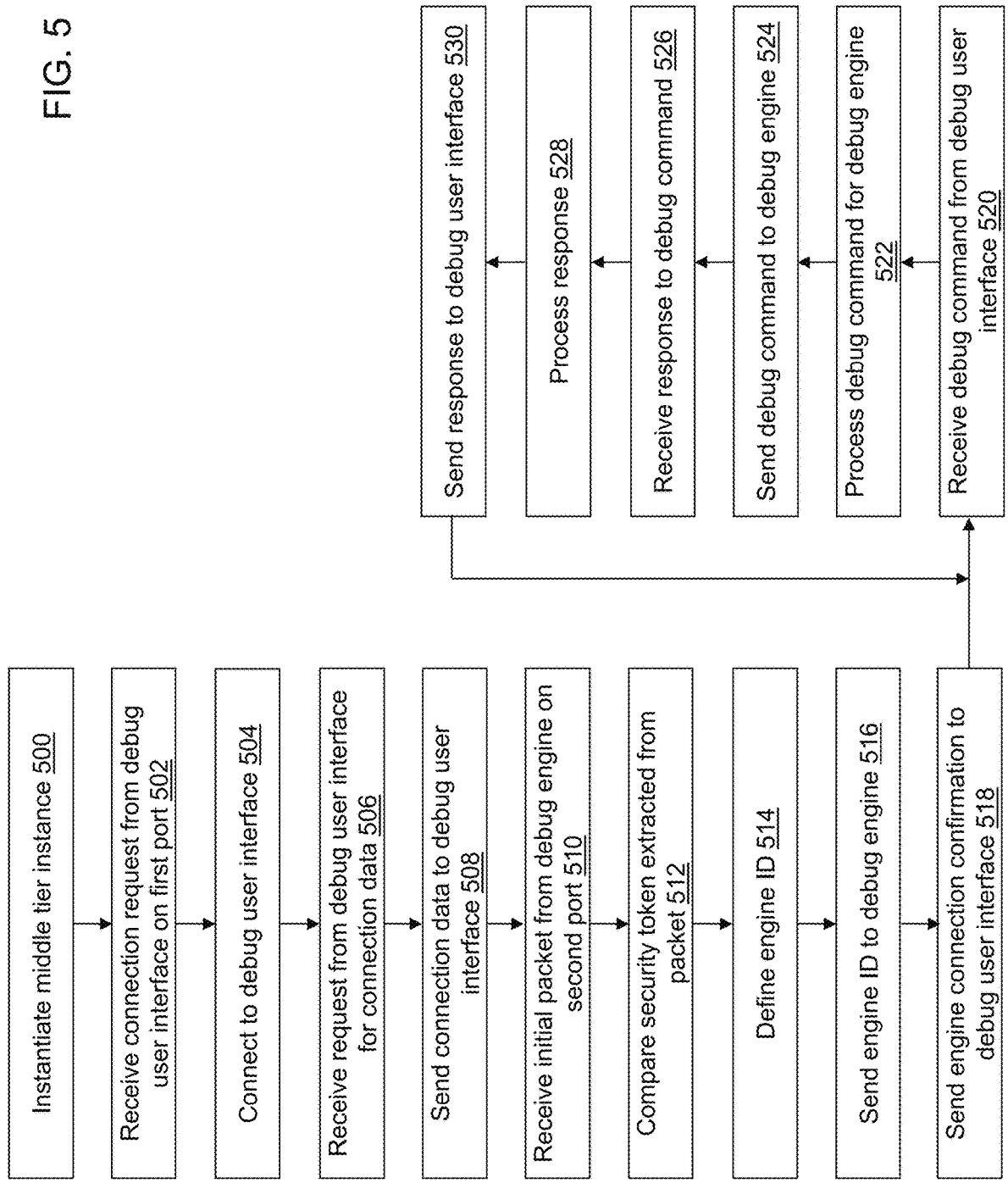

```
Code  1006
Functions and
Methods
 Filter
 Functions
    BS:bseopmCall
    BS.bseopmPut
 Methods
```

```
main.CMPMAIN  BS.bseopmPut  BS.bseopmCall  ×
 1  function bseopmCall (s, x, r, T, v);
 2    if (x ne 0 and x ne . and v ne 0 and v ne .) then
 3      do;
 4        d1 = (log(s/x) + ((r + (v**2)/2) * T)) / (v * sqrt(T));
 5        d2 = d1 - (v * sqrt(T));
 6        C = (s * probnorm(d1)) - (x * exp( (-r) * T) * probnorm(d2) );
 7      end;
 8      else
 9        C = .;
10      return(C);
11  endfunc;
```

FIG. 12

| Variables | _1014_ | | | _1400_ |
|---|---|---|---|---|
| Local  Global _1404_ | | | 🔍 Filter _1414_ | ⋮⋮ |
| Variable _1406_ | Type _1408_ | Value _1410_ | | |
| s | Num | 132.58 | | |
| x | Num | 130 | | |
| r | Num | 0.0222 | | |
| T | Num | 0.041095890411 | | |
| v | Num | 0.2882 | | |

_1412_

| Watch _1016_ | | | 🔍 Filter _1418_ | ⋮⋮ _1424_ |
|---|---|---|---|---|
| Variable _1426_ | Type _1428_ | Value _1430_ | + _1420_ | |
| x | Num | 130 | | |

| Variables 1014 | | | |
|---|---|---|---|
| Local  Global | | | Filter   1400 |
| Variable   1406 | Type   1408 | Value   1410 | 1414 |
| ▷ bb | Char [2,3] | | 1416 |
| ▽ zz | Num [2,3,4,5,6,7] | | |
| Add to watch list | Num [2] | | |
| Inspect array | Num [2,3,5] | | |
| select all | Num [45] | | |
| Clear selections | Char [3] | | |
| ▷ cc | Char [2,3] | | |
| ▷ yy | Num [2,3,5] | | |
| ▷ y | Num [45] | | |

DISTRIBUTED SOFTWARE DEBUGGING SYSTEM

CROSS-REFERENCE TO RELATED APPLICATIONS

The present application claims the benefit of and priority based on 35 U.S.C. § 119(e) to U.S. Provisional Patent Application No. 62/888,219 filed Aug. 16, 2019, to U.S. Provisional Patent Application No. 62/928,785 filed Oct. 31, 2019, and to U.S. Provisional Patent Application No. 62/959,265 filed Jan. 10, 2020, the entire contents of which are hereby incorporated by reference.

BACKGROUND

Typically, a user may debug a software application using a debug process that interacts with the software application running on the same computer or through a proxy running on a different computer that interacts with the software application on the different computer. However, traditional debug processes do not resolve issues associated with debugging a software application that is distributed, for example, to run in parallel on different computers and/or on different threads.

SUMMARY

In an example embodiment, a non-transitory computer-readable medium is provided having stored thereon computer-readable instructions that when executed by a computing device, cause the computing device to provide a debug process for a distributed application. A connection request is received from a debug user interface (UI) by a middle tier instance executing on the first computing device through a first predefined computer port of the first computing device. The connection request includes authentication data. The middle tier instance connects to the debug UI when an authentication is successful using the included authentication data. A connection data request is received from the debug UI by the middle tier instance. The connection data request indicates the connection is for a debug engine executing on a second computing device different from the first computing device. Connection data for the debug engine is sent from the middle tier instance to the debug UI. The connection data is provided to the debug engine from the debug UI. The connection data includes a second predefined computer port of the first computing device and a security token. The second predefined computer port is different than the first predefined computer port. (A) An initial packet is received by the middle tier instance from the debug engine through the second predefined computer port of the first computing device, wherein the initial packet includes the security token. (B) The security token included in the received initial packet is evaluated by the middle tier instance. (C) When the evaluated security token matches the security token included in the sent connection data, a unique engine identifier is defined for the debug engine by the middle tier instance, a notification is sent from the middle tier instance to the debug engine confirming a successful connection, and an engine connection confirmation is sent from the middle tier instance to the debug UI indicating that a connection with the debug engine has been established and including the unique engine identifier for the debug engine. (D) (A) to (C) are repeated with each debug engine of a plurality of debug engines as the debug engine. (E) A debug command is received from the debug UI by the middle tier instance, wherein the debug command includes a debug action to perform by the debug engine. (F) The debug command is sent to the debug engine to debug a software application as it is executing on the second computing device.

In another example embodiment, a first computing device is provided. The first computing device includes, but is not limited to, a processor and a non-transitory computer-readable medium operably coupled to the processor. The computer-readable medium has instructions stored thereon that, when executed by the processor, cause the first computing device to provide a debug process for a distributed application.

In yet another example embodiment, a method is provided for a debug process of a distributed application.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 5 depicts a flow diagram illustrating examples of operations performed by the middle tier device of FIG. 3 in accordance with an illustrative embodiment.

FIGS. 10 to 18 provide a graphical user-interface presented by the user device of FIG. 2 in accordance with an illustrative embodiment.

DETAILED DESCRIPTION

Figure 1:
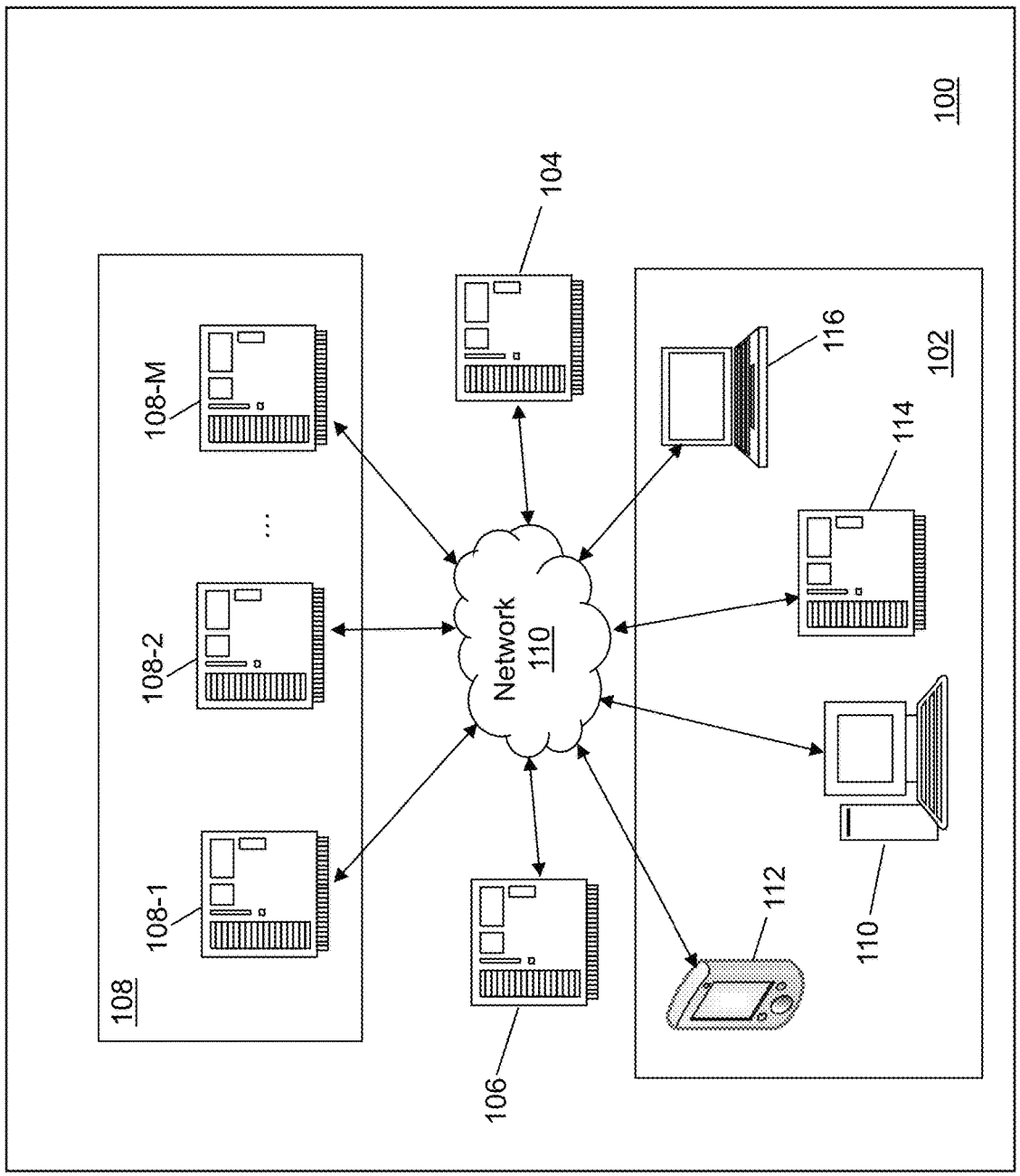
FIG. 1 depicts a block diagram of a debug system in accordance with an illustrative embodiment.

Referring to FIG. 1, a block diagram of a debug system 100 is shown in accordance with an illustrative embodiment. Debug system 100 supports remote debugging of different programming languages running on multiple computers and/or multiple threads in a distributed computing environment. Debug system 100 further supports profiling from within each remote debugging session. In an illustrative embodiment, debug system 100 may include a user system 102, a middle tier device 104, a workspace server 106, a worker system 108, and a network 110. For example, using debug system 100, a transmission control protocol/internet protocol (TCP/IP) port is predefined and used to establish connectivity between a user device of user system 102 and middle tier device 104. The predefined TCP/IP port is provided in software application to debug 226 (shown referring to FIG. 2) to convey the information needed for computing devices of worker system 108 that execute software application to debug 226 to connect to middle tier device 104. This connectivity supports software application to debug 226 to be debugged when, for example, a user who submits software application to debug 226 in a web service does not have direct login access to the computing devices of worker system 108.

Network 110 may include one or more networks of the same or different types. Network 110 can be any type of wired and/or wireless public or private network including a cellular network, a local area network, a wide area network such as the Internet or the World Wide Web, etc. Network 110 further may comprise sub-networks and consist of any number of communication devices.

The one or more computing devices of user system 102 may include computing devices of any form factor such as a desktop 110, a smart phone 112, a server computer 114, a laptop 116, a personal digital assistant, an integrated messaging device, a tablet computer, etc. User system 102 can include any number and any combination of form factors of computing devices. In general, a "server" computer may include faster processors, additional processors, more disk memory, and/or more random access memory (RAM) than another computer form factors and support multi-threading as understood by a person of skill in the art. The computing devices of user system 102 may send and receive signals through network 110 to/from another of the one or more computing devices of user system 102 and/or to/from middle tier device 104 and/or to/from workspace server 106. The one or more computing devices of user system 102 may communicate using various transmission media that may be wired and/or wireless as understood by those skilled in the art. The one or more computing devices of user system 102 may be geographically dispersed from each other and/or co-located.

Figure 2:
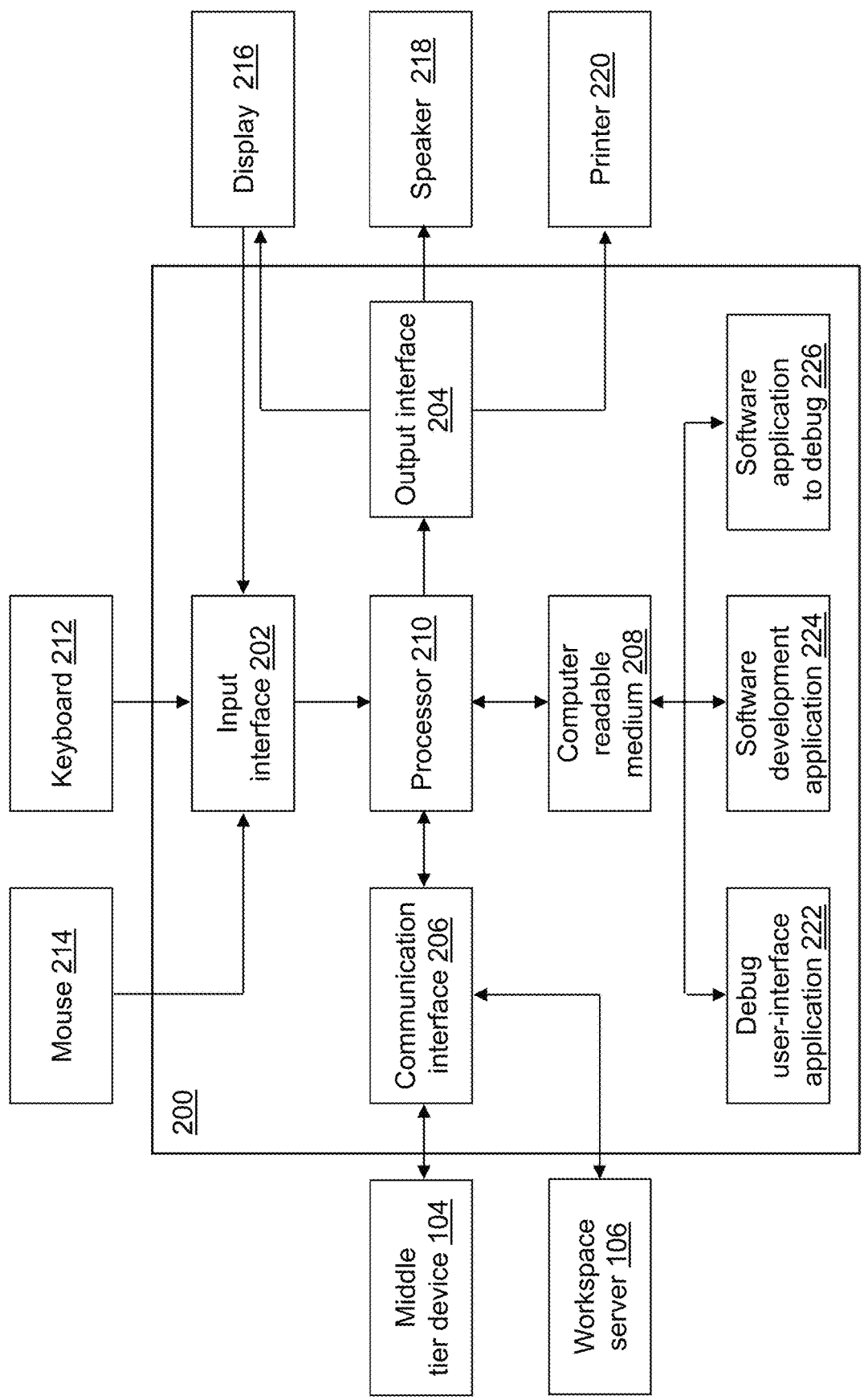
FIG. 2 depicts a block diagram of a user device of the debug system of FIG. 1 in accordance with an illustrative embodiment.

For illustration, referring to FIG. 2, a block diagram of a user device 200 is shown in accordance with an example embodiment. User device 200 is an example computing device of user system 102. For example, each of desktop 110, smart phone 112, server computer 114, and laptop 116 may be an instance of user device 200. User device 200 may include an input interface 202, an output interface 204, a communication interface 206, a computer-readable medium 208, a processor 210, a debug user-interface (UI) application 222, a software development application 224, and software application to debug 226. Each computing device of user system 102 may be executing debug UI application 222 and/or software development application 224 of the same or different type.

Referring again to FIG. 1, middle tier device 104 can include any form factor of computing device. For illustration, FIG. 1 represents middle tier device 104 as a server computer. Middle tier device 104 may send and receive signals through network 110 to/from user system 102 and/or to/from worker system 108. Middle tier device 104 may communicate using various transmission media that may be wired and/or wireless as understood by those skilled in the art.

Figure 3:
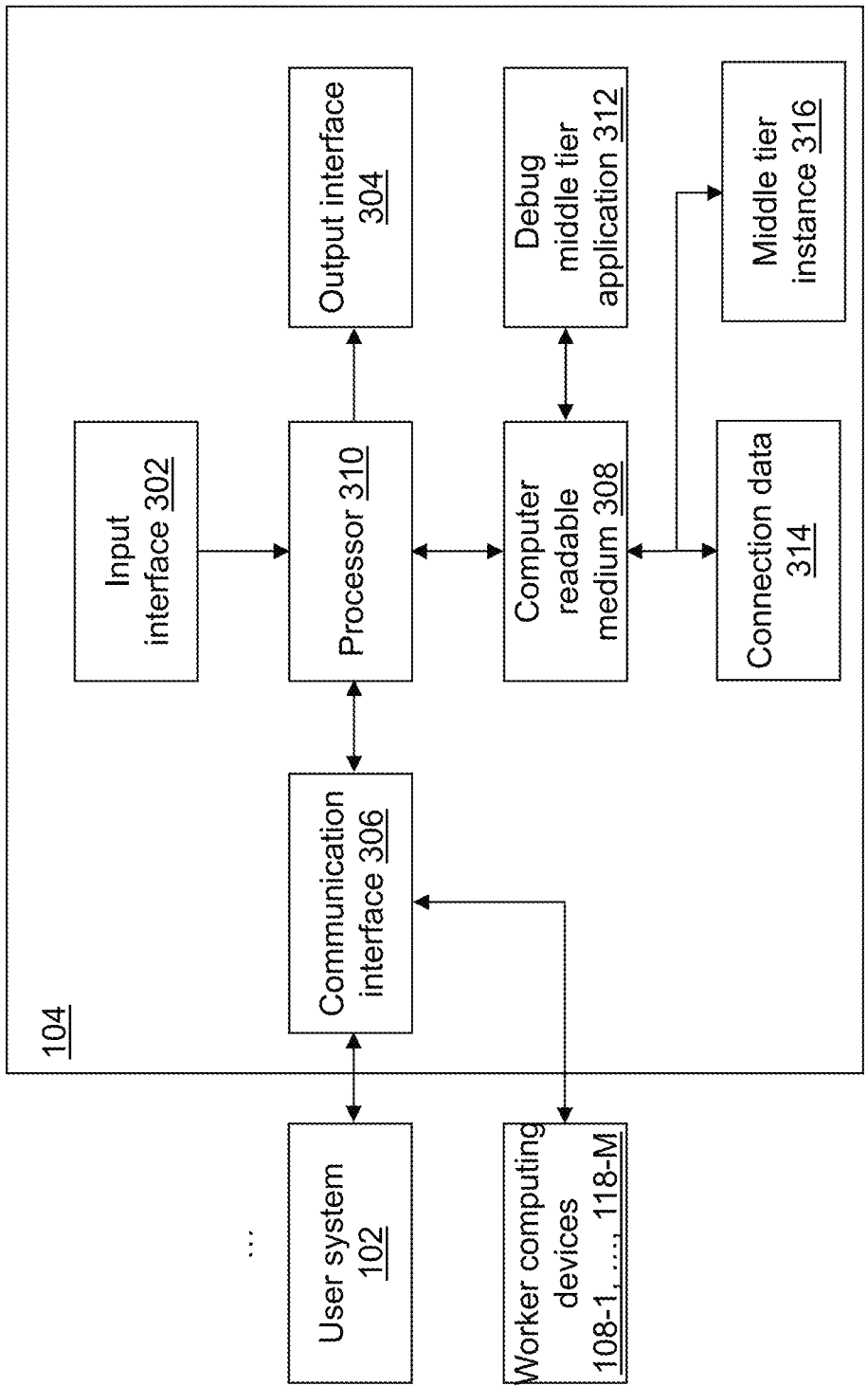
FIG. 3 depicts a block diagram of a middle tier device of the debug system of FIG. 1 in accordance with an illustrative embodiment.

For illustration, referring to FIG. 3, a block diagram of middle tier device 104 is shown in accordance with an illustrative embodiment. Middle tier device 104 may include a second input interface 302, a second output interface 304, a second communication interface 306, a second computer-readable medium 308, a second processor 310, a debug middle tier application 312, connection data 314, and middle tier instance 316.

Referring again to FIG. 1, workspace server 106 can include any form factor of computing device. For illustration, FIG. 1 represents workspace server 106 as a server computer. Workspace server 106 may send and receive signals through network 110 to/from user system 102 and/or to/from worker system 108. Workspace server 106 may communicate using various transmission media that may be wired and/or wireless as understood by those skilled in the art.

Figure 4A:
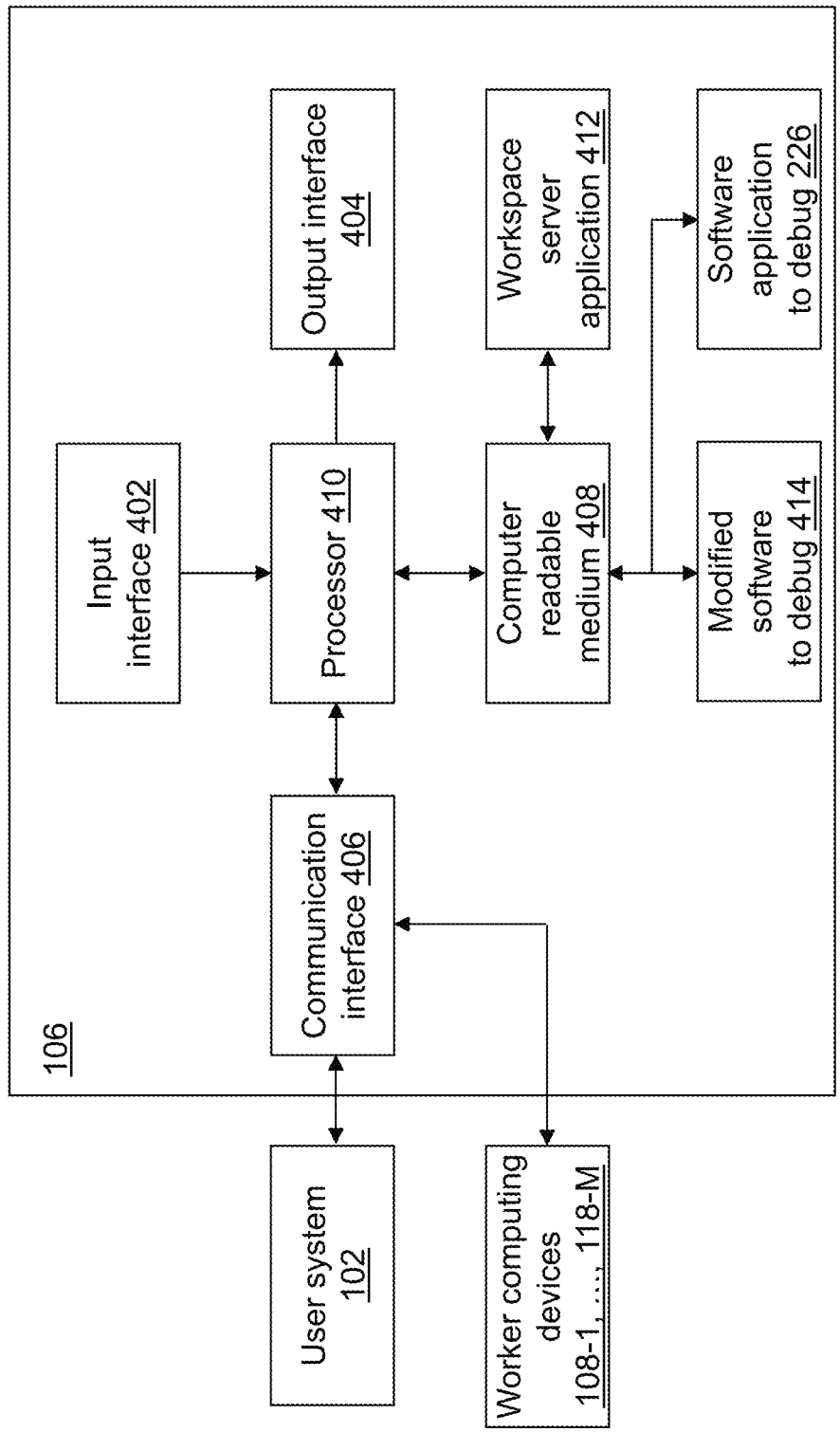
FIG. 4A depicts a block diagram of a workspace server of the debug system of FIG. 1 in accordance with an illustrative embodiment.

For illustration, referring to FIG. 4A, a block diagram of workspace server 106 is shown in accordance with an illustrative embodiment. Workspace server 106 may include a third input interface 402, a third output interface 404, a third communication interface 406, a third computer-readable medium 408, a third processor 410, a workspace server application 412, modified software to debug 414, and software application to debug 226.

Referring again to FIG. 1, the one or more computing devices of worker system 108 may include computers of any form factor. Worker system 108 may include a number of computing devices indicated by M. Worker system 108 may include computers of other form factors such as a desktop or a laptop, etc. Worker system 108 can include any number and any combination of form factors of computing devices. For example, in the illustrative embodiment, worker system 108 includes a first worker computing device 108-1, a second worker computing device 108-2, . . . , and an $M^{th}$ worker computing device 108-M. A number of threads may be associated with each computing device of worker system 108.

The computing devices of worker system 108 may send and receive signals through network 110 to/from middle tier device 104 and/or to/from workspace server 106. The one or more computing devices of worker system 108 may be geographically dispersed from each other and/or co-located. The one or more computing devices of worker system 108 may communicate using various transmission media that may be wired and/or wireless as understood by those skilled in the art.

Figure 4B:
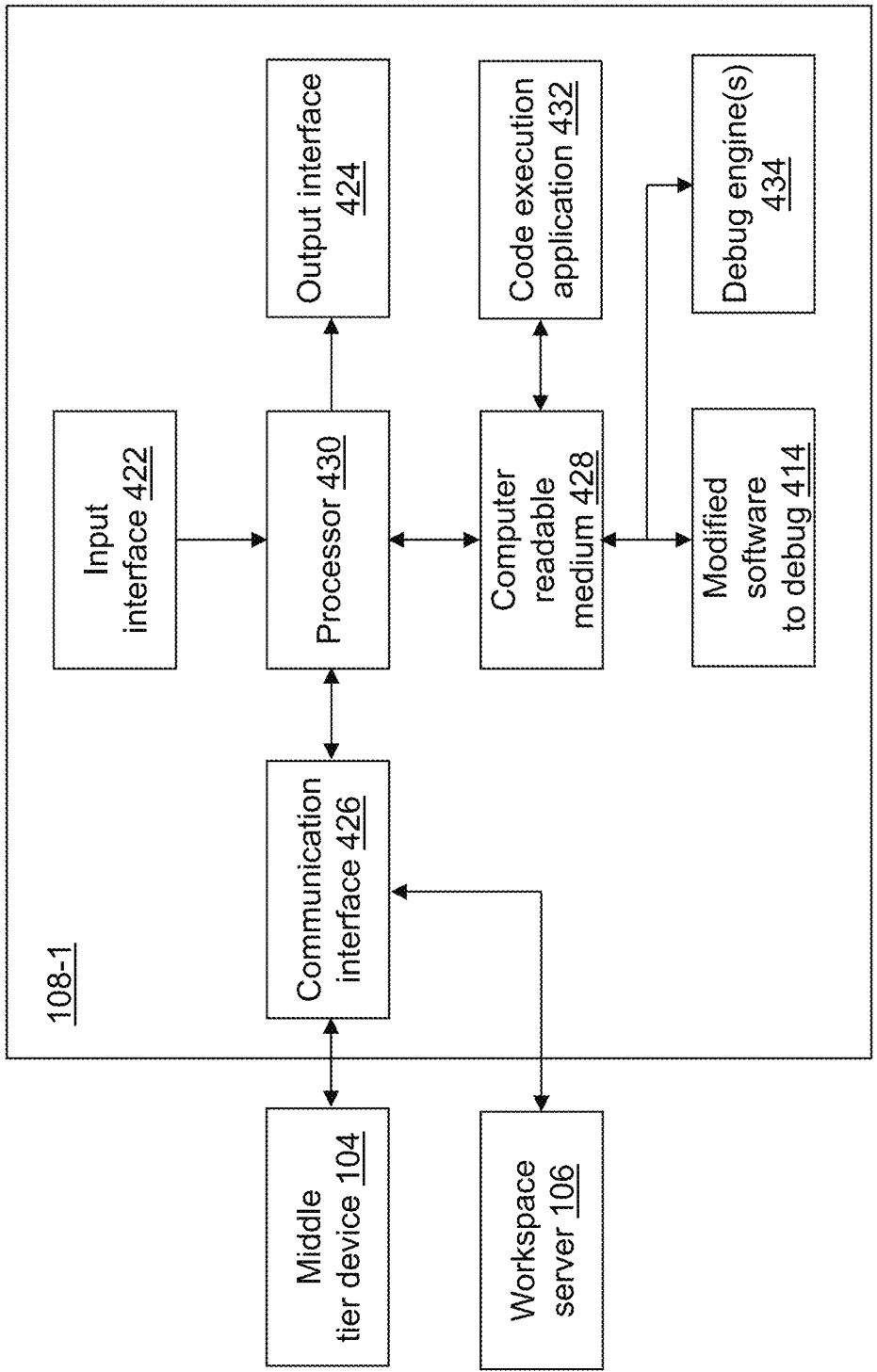
FIG. 4B depicts a block diagram of a worker device of the debug system of FIG. 1 in accordance with an illustrative embodiment.

For illustration, referring to FIG. 4B, a block diagram of first worker computing device 108-1 is shown in accordance with an example embodiment. First worker computing device 108-1 is an example computing device of worker system 108. First worker computing device 108-1 may include a fourth input interface 422, a fourth output interface 424, a fourth communication interface 426, a fourth computer-readable medium 428, a fourth processor 430, a code execution application 432, modified software to debug 414, and a debug engine 434.

Referring again to FIG. 2, each user device 200 of user system 102 may include the same or different components and combination of components. Fewer, different, and additional components may be incorporated into user device 200.

Input interface 202 provides an interface for receiving information for entry into user device 200 as understood by those skilled in the art. Input interface 202 may interface with various input technologies including, but not limited to, a keyboard 212, a mouse 214, a display 216, a track ball, a keypad, one or more buttons, etc. to allow the user to enter information into user device 200 or to make selections presented in a UI displayed on display 216. The same interface may support both input interface 202 and output interface 204. For example, display 216 that includes a touch screen both allows user input and presents output to the user. User device 200 may have one or more input interfaces that use the same or a different input interface technology. The input interface technology further may be accessible by user device 200 through communication interface 206.

Output interface 204 provides an interface for outputting information from user device 200, for example, to a user of user device 200 or to another device. For example, output interface 204 may interface with various output technologies including, but not limited to, display 216, a speaker 218, a printer 220, etc. User device 200 may have one or more output interfaces that use the same or a different interface technology. The output interface technology further may be accessible by user device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. User device 200 may have one or more communication interfaces that use the same or a different communication interface technology. For example, user device 200 may support communication using an Ethernet port, a Bluetooth antenna, a telephone jack, a USB port, etc. Data and messages may be transferred between user device 200 and middle tier device 104 and between user device 200 and workspace server 108 using communication interface 206.

Computer-readable medium 208 is a non-transitory electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. User device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. User device 200 also may have one or more drives that support the loading of a memory media such as a CD or DVD, an external hard drive, etc. One or more external hard drives further may be connected to user device 200 using communication interface 106.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. User device 200 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit (GPU), an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Debug UI application 222 performs operations associated with controlling a debug process executed on modified software to debug 414 by a user. The operations may be implemented using hardware, firmware, software, or any combination of these methods. Referring to the example embodiment of FIG. 2, debug UI application 222 is implemented in software (comprised of computer-readable and/or computer-executable instructions) stored in computer-readable medium 208 and accessible by processor 210 for execution of the instructions that embody the operations of debug UI application 222. Debug UI application 222 may be written using one or more programming languages, assembly languages, scripting languages, etc.

Debug UI application 222 may be implemented as a Web application. For example, debug UI application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an XML file, or any other type of file supported by HTTP.

Software development application 224 performs operations associated with supporting development of software application to debug 226 by the user. The operations may be implemented using hardware, firmware, software, or any combination of these methods. Referring to the example embodiment of FIG. 2, software development application 224 is implemented in software (comprised of computer-readable and/or computer-executable instructions) stored in computer-readable medium 208 and accessible by processor 210 for execution of the instructions that embody the operations of software development application 224. Software development application 224 may be written using one or more programming languages, assembly languages, scripting languages, etc. Software development application 224 may be implemented as a Web application.

Software development application 224 may be implemented using or integrated with one or more SAS software tools such as Base SAS, SAS/STAT®, SAS® Enterprise Miner™, SAS® Viya™, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS In-Memory Statistics for Hadoop®, SAS® Forecast Server, SAS© High-Performance Risk, etc., developed and provided by SAS Institute Inc. of Cary, N.C., USA.

Referring again to FIG. 3, fewer, different, or additional components may be incorporated into middle tier device 104. Middle tier device 104 and user device 200 may be the same or different devices. Second input interface 302 provides the same or similar functionality as that described with reference to input interface 202 of user device 200 though referring to middle tier device 104. Second output interface 304 provides the same or similar functionality as that described with reference to output interface 204 of user device 200 though referring to middle tier device 104. Second communication interface 306 provides the same or similar functionality as that described with reference to communication interface 206 of user device 200 though referring to middle tier device 104. Data and messages may be transferred between middle tier device 104 and/or user device 200 and workspace server 106 using second communication interface 306. Second computer-readable medium 308 provides the same or similar functionality as that described with reference to computer-readable medium 208 of user device 200 though referring to middle tier device 104. Second processor 310 provides the same or similar functionality as that described with reference to processor 210 of user device 200 though referring to middle tier device 104.

Debug middle tier application 312 performs operations associated with establishing communication with, for example, user device 200 and worker computing device 108-1 and providing debug commands and responses between, for example, user device 200 and worker computing device 108-1. The operations may be implemented using hardware, firmware, software, or any combination of these methods. Referring to the example embodiment of FIG. 3, debug middle tier application 312 is implemented in software (comprised of computer-readable and/or computer-executable instructions) stored in second computer-readable medium 308 and accessible by second processor 310 for execution of the instructions that embody the operations of debug middle tier application 312. Debug middle tier application 312 may be written using one or more programming languages, assembly languages, scripting languages, etc. Debug middle tier application 312 may be implemented as a Web application.

Referring again to FIG. 4A, fewer, different, and additional components may be incorporated into workspace server 106. Third input interface 402 provides the same or similar functionality as that described with reference to input interface 202 of user device 200 though referring to workspace server 106. Third output interface 404 provides the same or similar functionality as that described with reference to output interface 204 of user device 200 though referring to workspace server 106. Third communication interface 406 provides the same or similar functionality as that described with reference to communication interface 206 of user device 200 though referring to workspace server 106. Data and messages may be transferred between workspace server 106 and user system 102 and/or worker system 108 using third communication interface 406. Third computer-readable medium 408 provides the same or similar functionality as that described with reference to computer-readable medium 208 of user device 200 though referring to workspace server 106. Third processor 410 provides the same or similar functionality as that described with reference to processor 210 of user device 200 though referring to workspace server 106.

Workspace server application 412 performs operations associated with establishing communication with controlling execution of software application to debug 226 distributed across worker system 108 and/or across a plurality of threads of workspace server 106. The operations may be implemented using hardware, firmware, software, or any combination of these methods. Referring to the example embodiment of FIG. 4A, workspace server application 412 is implemented in software (comprised of computer-readable and/or computer-executable instructions) stored in third computer-readable medium 408 and accessible by third processor 410 for execution of the instructions that embody the operations of workspace server application 412. Workspace server application 412 may be written using one or more programming languages, assembly languages, scripting languages, etc. Workspace server application 412 may be implemented as a Web application. For illustration, workspace server application 412 may be the SAS® LASR™ Analytic Server, SAS® Viya™, SAS Cloud Analytic Services (CAS) with associated cloud services in SAS Viya, SAS In-Memory Statistics for Hadoop®, etc. developed and provided by SAS Institute Inc. of Cary, N.C., USA. Apache™ Hadoop® is an open-source software framework for distributed computing supported by the Apache Software Foundation.

Referring again to FIG. 4B, fewer, different, and additional components may be incorporated into first worker computing device 108-1. Each first worker computing device 108-1 of worker system 108 may include the same or different components or combination of components. For illustration, worker system 108 may be implemented as a grid of computers, as a multi-node Hadoop® cluster, as a cloud of computers accessed using cloud computing technologies, etc.

Fourth input interface 422 provides the same or similar functionality as that described with reference to input interface 202 of user device 200 though referring to first worker computing device 108-1. Fourth output interface 424 provides the same or similar functionality as that described with reference to output interface 204 of user device 200 though referring to first worker computing device 108-1. Fourth communication interface 426 provides the same or similar functionality as that described with reference to communication interface 206 of user device 200 though referring to first worker computing device 108-1. Data and messages may be transferred between first worker computing device 108-1 and middle tier device 104 and/or workspace server 106 using fourth communication interface 426. Fourth computer-readable medium 428 provides the same or similar functionality as that described with reference to computer-readable medium 208 of user device 200 though referring to first worker computing device 108-1. Fourth processor 430 provides the same or similar functionality as that described with reference to processor 210 of user device 200 though referring to first worker computing device 108-1.

Code execution application 432 performs operations associated with executing modified software to debug 414 as part of a debug process. The operations may be implemented using hardware, firmware, software, or any combination of these methods. Referring to the example embodiment of FIG. 4B, code execution application 432 is implemented in software (comprised of computer-readable and/or computer-executable instructions) stored in fourth computer-readable medium 428 and accessible by fourth processor 430 for execution of the instructions that embody the operations of code execution application 432. Code execution application 432 may be written using one or more programming languages, assembly languages, scripting languages, etc. Code execution application 432 may be implemented as a Web application. For illustration, code execution application 432 may be created using SAS® 9.4, SAS® Studio, SAS® Viya, etc.

Referring to FIG. 5, example operations associated with debug middle tier application 312 are described. Additional, fewer, or different operations may be performed depending on the embodiment. The order of presentation of the operations of FIG. 5 is not intended to be limiting. Middle tier device 104 establishes communication with the computing devices of user system 102 and the computing devices of worker system 108 and acts as a proxy between a debug UI instantiated on user device 200 and a plurality of debug engines. In some cases, middle tier device 104 establishes communication with the computing devices of user system 102 and workspace server 106 and acts as a proxy between a debug UI instantiated on user device 200 and the plurality of debug engines.

Middle tier instance 316 may provide access over the web to debug engine 434. Four representational state transfer (REST) application program interface (API) endpoints are implemented by middle tier instance 316 for the debug UI to interact with each debug engine 434. These API's provide the following functions.

1. Creates a debug session and provides connection information for executing code to connect debug engine 434 to middle tier instance 316.
2. Answers the connection state of the debug session, i.e., is debug engine 434 successfully connected to middle tier instance 316.
3. Accepts commands and command parameters from the debug UI, sends those commands to debug engine 434, and returns debug engine 434 responses to the debug UI.
4. Provides special handling for asynchronous, potentially long-running, commands such that the debug UI can issue the command, and asynchronously request the command's response.

Asynchronous commands are handled by middle tier instance 316 through the use of "future" tasks. Each task executes in a separate thread to send its command to debug engine 434 and wait for the response from debug engine 434. This execution mechanism allows middle tier instance 316 to schedule execution of a potentially long-running asynchronous command without blocking the debug UI while waiting for debug engine 434 to complete execution and return its response. The debug UI asynchronously and periodically queries middle tier instance 316 for the command response, and the response is returned once the asynchronous command has completed.

In an operation 500, middle tier instance 316 is instantiated prior to initiating a debugging session. Once instantiated, middle tier instance 316 listens on a first predefined port number that for illustration is a TCP/IP port.

In an operation 502, a connection request is received from the debug UI under control of debug UI application 222 through the first predefined port number.

In an operation 504, a first connection is established with the debug UI hosted by user device 200 using REST API calls issued from the debug UI to middle tier device 104. User device 200 accepts commands from a user entered into the debug UI and relays instructions to middle tier device 104 through the connection.

In an operation 506, a request for connection data 314 is received from the debug UI under control of debug UI application 222.

In an operation 508, connection data 314 is sent to the debug UI under control of debug UI application 222. connection data 314 may include a hostname of middle tier instance 316, a security token, and a second predefined port number.

In an operation 510, an initial packet is received from debug engine 434. Middle tier device is also listening on the second predefined port number included in connection data 314. In an illustrative embodiment, the second predefined port number is a TCP/IP port.

In an operation 512, a security token extracted from the received initial packet is compared to the security token included in connection data 314.

When the security tokens match, operations 514 to 530 are performed for debug engine 434. When the security tokens do not match, an error message may be sent to debug engine 434, and processing continues in operation 510 to continue listening for connection requests from each debug engine 434 of the plurality of debug engines.

In an operation 514, a unique engine identifier (ID) is defined for debug engine 434. The engine ID may be generated using a deterministic hash of an incoming node connection info (host/rank), a thread ID, and a 32 character session token. Subsequent connections from the same debug engine 434 during the same debugging session result in the same generated engine ID. The engine ID may be used as a means of routing commands to a specific debug engine 434.

In an operation 516, the defined unique engine ID is sent to debug engine 434 indicating that a second connection has been established between middle tier instance 316 and that debug engine 434.

In an operation 518, an engine connection confirmation is sent to the debug UI using the first connection indicating that debug engine 434 has connected. The engine connection confirmation may include the defined unique engine ID.

Operations 510 to 518 may be repeated for each debug engine 434 created for each thread of each worker computing device of worker system 108 or for each thread of workspace server 106 thereby defining the plurality of debug engines. The plurality of debug engines may include a first subset that are instantiated on different threads of a worker computing device or of workspace server 106. The plurality of debug engines may further include a second subset that are instantiated on different worker computing devices of worker system 108.

The debugging process may be initiated when a first connection is made by debug engine 434 from any thread/node combination. The first connection may be the thread/node the debug UI displays at the start of the debugging session. Middle tier device 104 may continue to accept incoming connections throughout the life of the session, updating the plurality of debug engines.

After a first debug engine 434 has connected, in an operation 520, a debug command is received from the debug UI under control of debug UI application 222.

In an operation 522, the debug command is processed.

In an operation 524, the processed debug command is sent to debug engine 434. For example, as discussed further below, an engine argument may be removed from the debug command received from the debug UI before sending the debug command to the debug engine 434.

In an operation 526, a response to the sent debug command is received from debug engine 434.

In an operation 528, the received response is processed. The received response may be formatted using a scripting language such as the extensible markup language or JavaScript object notation (JSON). The formatted responses from debug engine 434 may be deserialized by middle tier instance 316 into different objects more appropriate for use by the debug UI. This deserialization/re-construction mechanism may provide the following features and advantages:

1. The objects provided to the debug UI have attribute names which more closely follow REST API standards, e.g., no abbreviations, and are more human-readable,
2. Various codes from debug engine 434, e.g. variable type and kind, are identified fully and the resulting names are localized to the debug UI's locale,
3. Error codes from debug engine 434 are associated with complete error messages, which are also localized to the debug UI's locale,
4. Special handling is provided for response attributes from debug engine 434 that can represent different data types for different commands. For example, an attribute's value is a complete object for one command but an array of integers for another command. These differences are de-serialized and re-packaged, and
5. Empty or missing variable values from debug engine 434 are returned as the string value "null". These values may be converted to actual null values before being re-serialized to the debug UI.

In an operation 530, the processed response is sent to the debug UI under control of debug UI application 222, and processing continues in operation 520 to continue to process debug commands until debug processing is complete.

Figure 6:
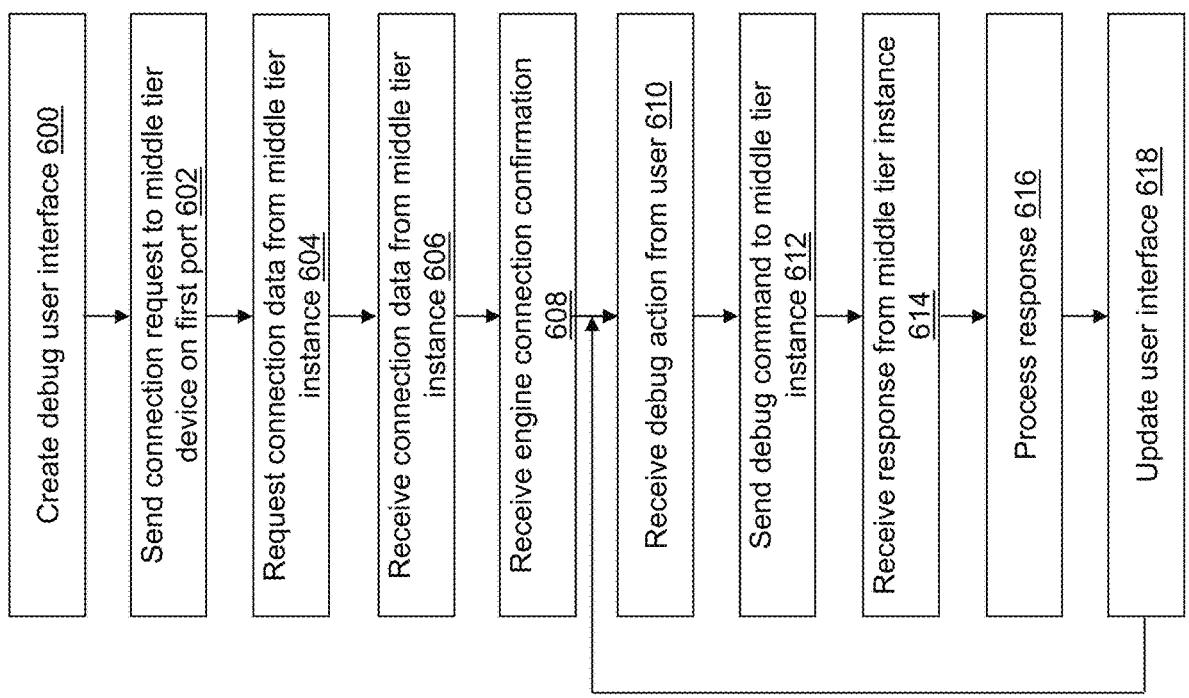
FIG. 6 depicts a flow diagram illustrating examples of first operations performed by the user device of FIG. 2 in accordance with an illustrative embodiment.

Referring to FIG. 6, example first operations associated with debug UI application 222 are described. Additional, fewer, or different operations may be performed depending on the embodiment. The order of presentation of the operations of FIG. 6 is not intended to be limiting. A user can interact with one or more UI windows presented to the user in display 216 under control of debug UI application 222 independently or through a browser application in an order selectable by the user. Although some of the operational flows are presented in sequence, the various operations may be performed in various repetitions, concurrently, and/or in other orders than those that are illustrated. For example, a user may execute debug UI application 222, which causes presentation of a first UI window, which may include a plurality of menus and selectors such as drop-down menus, buttons, text boxes, hyperlinks, etc. associated with debug UI application 222 as understood by a person of skill in the art In an operation 600, the debug UI is created. Referring to FIGS. 10 to 15, a debug UI 1000 presented by user device 200 under control of debug UI application 222 is shown in accordance with an illustrative embodiment.

In an operation 602, the connection request is sent to middle tier instance 316 on the first predefined port number. When authentication is successful, the first connection is established between the debug UI and middle tier instance 316.

In an illustrative embodiment, debug UI application 222 implemented as a web-based application, the user creates the debug UI by opening a web browser and making a request to middle tier instance 316 to load the UI into the browser. For example, this request may have the form https://[hostname]:[port]/SASCodeDebugger. This URL may map to an index.jsp file that contains the HTML markup that loads debug UI application 222. Authentication is provided by a logon service that authenticates each request made by the browser to middle tier instance 316. If the user is not already authenticated, the request to load the UI is redirected to a logon service that requests that the user provide their authentication credentials. Once authentication is complete, the logon service redirects back to the original request, which allows the UI to begin loading into the browser and executing.

In an operation 604, connection data 314 is requested from middle tier instance 316.

In an operation 606, connection data 314 is received from middle tier instance 316.

In an operation 608, the engine connection confirmation is received from middle tier instance 316 that includes the unique engine ID for a respective debug engine 434. Operation 608 may be repeated for each debug engine of the plurality of debug engines.

In an operation 610, a debug action is received from the user. For example, referring to FIG. 10, the user may interact with debug UI 1000 to define a debug action requested by the user. The debug action is translated into a debug command. In the illustrative embodiment, debug UI 1000 is structured as a set of panels separated by splitters, which can be rearranged, resized, added, removed, maximized, and minimized. The arrangement and size of the panels may be saved on a per-browser basis each time the user exits debug UI application 222 and may be restored when they return.

Debug UI 1000 may be implemented within a browser window and include a URL textbox 1002, a toolbar 1004, a functions/methods list 1006, a code window 1008, a call stack window 1010, a break point window 1012, a variables window 1014, a watch variable window 1016, a console window 1018, and a command line text box 1020.

For performance and user experience reasons, debug UI application 222 may cache break points, the set of functions and methods for a given execution context, source code, variables, watch variables, and log statements. Maintenance of these caches reduces calls over time to middle tier instance 316, and allows for panels to be quickly restored to their correct state when added back to debug UI 1000.

In an illustrative embodiment, the debug UI is a JavaScript web UI. Debug engine 434 may allow one command to be executed at a time. To ensure that the debug UI does not make a request to execute a command while a prior request is pending, the UI may use a command queue that generically executes requests generated by either user activity or as a reaction to response data returned by an executed command. When a response for an executed command is received from middle tier instance 316, it is routed through a response handler that provides custom behavior depending on the command executed. For example, a completed "step" command updates a current stack location, potentially triggering a request for code if execution is stopped in a function or method that is not yet cached, and an update to the set of variables and their values presented, for example, in debug UI 1000.

Middle tier instance 316 generates command syntax that debug engine 434 parses via text streams sent between the TCP/IP ports. Additionally, middle tier instance 316 can pass command syntax directly to the engine, allowing the debug UI to provide a command line interface that passes debug commands directly to the engine without modification. The debug UI handling of commands issued via the command line is the same for the equivalent commands generated by user interaction, as the response structures returned by middle tier instance 316 for equivalent commands are the same.

The debug action may be a "status" command selected by the user to request that debug engine 434 indicate whether execution can be continued. The command syntax may be "status" that is generated by the debug UI. The response generated by debug engine 434 may include the following shown using JSON that is returned to the debug UI by middle tier instance 316:

```
{
  "response": {
    "command": "status",
    "transactionid": 0,
    "currentline": 12,
    "currentfunc": "CMPMAIN",
    "package": "main",
    "status": 0,
    "message": "Command success"
  }
}
```

The "command" field value indicates the response is with reference to a status command debug action, the "transactionid" field value is used to identify commands for asynchronous commands and may be "0" when the command is synchronous, the "currentline" field value indicates a currently executing line of modified software to debug 414 on debug engine 434, the "currentfunc" field value indicates the function in which the currently executing line of modified software to debug 414 is located, the "package" field value indicates the package in which the function is located, the "status" field value indicates a current status of debug engine 434, and the "message" field value indicates a success or failure of the command execution.

The "transactionid" field value may be sent to debug engine 434 and returned in the response to allow middle tier instance 316 and the debug UI to differentiate between multiple JSON responses potentially received out of order from multiple prior issued commands.

For illustration, status codes may include the following:
0—ok, no error
1—parse error in command
2—duplicate arguments in command
3—invalid options (e.g. missing, invalid, or unsupported option)
4—unrecognized command
5—command not available (e.g. current debug state does not allow it)
100—cannot open file
101—stream redirect failed
200—break point could not be set
201—break point type not supported
202—invalid break point
203—no code at break point line
204—invalid break point state
300—Cannot get property
301—Stack depth invalid
302—Context invalid
404—Unknown command
406—Required option not specified
407—Variable/symbol not found
408—Mismatching variable/symbol types
409—Failure to change value of immutable variable
900—Encoding not supported
998—An internal exception occurred in debug engine 434
999—Unknown error Though not shown, all commands in the command set may optionally include the argument -g<engineID>, where "engineID" indicates an optional engine ID associated with a specific debug engine 434 to which the command is addressed. Commands containing this argument are routed to the specific debug engine 434 corresponding to the specified engineID value. If no engineID is specified for a command, the command is routed to the current environment. In an illustrative embodiment, when specified, middle tier instance 316 removes the argument -g <engineID> in operation 522 before sending the debug command to debug engine 434.

The current environment represents the current line of execution for a single frame of a function and package delimited program call stack of a specific debug engine 434. The debug UI automatically displays source code associated with the current environment. Upon starting the debug session, the default environment is a top of a call stack of modified software to debug 414 for a first debug engine 434 that connected. Commands issued in the current environment execute within the scope of the environment's stack frame. The "env" command described further below can be used to change the current environment.

Debug engine 434 maintains a record of a current call stack. Stack frames are added to the call stack when stepping into another block of code, such as a method, function, or subroutine. Each call stack frame has a numbered stack level and can be referenced by stack frame number in the debugger commands. The top call stack frame correlates to the block of code containing the current line of execution. Each call stack frame maintains the current line of execution within its block of code. Middle tier instance 316 also maintains a record of the current program call stack. Multiple instances of debug engine 434 can be running during one program. A program may also contain code for multiple programming languages, e.g. FCMP and CASL languages. A function call in one language can cause program execution to switch to a second program language. In this scenario, the two debug engines 434 are both running but are not directly aware of the call stack of the other. To provide a unified view for the user, middle tier instance 316 combines the call stack frames from each debug engine 434 associated with the program. Middle tier instance 316 obtains call stack frame information from both debug engines 434 and concatenates the call stack frame information together before returning it to the debug UI and presenting it to the user. Debug engine 434 does not communicate directly with any other debug engine 434 so the record of the current call stack maintained by middle tier instance 316 is used, which may contain stack frames from multiple different debug engines 434.

Variables hold in-memory data for use within modified software to debug 414. Each variable has a lifetime and a scope of visibility within modified software to debug 414 where the two are related. Generally, variables with a lifetime that exists throughout the lifetime of a procedure or action are considered more global in scope. A variable defined within the context of a function or subroutine is considered more local in scope and exists only while program execution is within the function (or subroutine) context. In addition, some variables are provided by the language runtime environment while others are defined by the user. The following is a list of common variable scopes:

1. System scope—variables provided by the language runtime environment, not directly modified by the user (immutable), although their value may be referenced within modified software to debug 414.
2. Global scope—variables provided by the language runtime or the user.
3. Function and Subroutine (local) scope—variables defined within a function or subroutine. Scope is limited to the function or subroutine.
4. Function and Subroutine argument scope—variables defined as arguments for a function or subroutine have a scope limited to the body of the function or subroutine.
5. Method scope—variables defined within a method have global scope.
6. Package scope—variables defined within a package are visible to the code within the package. Program execution must be within the context of package code for the variable to be visible.
7. Object scope—variables with a language object, like the hash or dictionary object, or a results object, are visible to the code in which they are defined. Additionally, debug engine 434 can expose object data considered public to the user of the debug UI.

Debug system 100 provides flexibility to its various language debug engines by allowing debug engine 434 to define the names of the scopes debug engine 434 intends to reference during the debug session. Not every language has all of the above listed variable scopes, and future programming language expansion supports the creation of new variable scopes as needed. The possible variable scopes for modified software to debug 414 are provided by debug engine 434 in the "scopes" field value of the initial packet. Scopes are provided in a comma separated list sorted by priority, with the broadest scope being the first element in the list and the most local scope being the last. Each stack frame on the program call stack has an assigned variable scope, which is deemed the most local scope for execution within that frame unless additional scopes are present in subsets of the code block. By default, when issuing commands that interact with program variables, debug engine 434 applies the command to the variable in the most local scope for the current line of execution. If the variable is not defined in the most local scope, debug engine 434 searches broader scopes until the variable is found or the end of the scope list is reached.

For responses from debug engine 434 that contain variables, a scope may be included to dictate which section the variable is placed in by the debug UI. If a variable is returned from debug engine 434 with no scope specified in the response, the debug UI places the variable in the default scope.

The debug action may be a "get" command selected by the user to retrieve meta information and settings values from debug engine 434. The command syntax may be "get -n<feature_name>", that is generated by the debug UI, where "feature_name" indicates an optional feature name, and "value" is the value to which the indicated feature name is set or the most recently used feature name if one is not specified. The response generated by debug engine 434 may include the following shown using JSON that is returned to the debug UI by middle tier instance 316:

{
      "response": {
        "command": "get",
        "transactionid": 0,
        "currentline": 12,
        "currentfunc": "CMPMAIN",
        "package": "main",
        "status": 0,
        "feature_name": "max_depth",
        "feature_value": 100
      }
    }

The "feature_name" field value indicates the feature name to which the get command was directed, and the "feature_value" field value indicates the current value of the feature name indicated.

The user can view very large arrays by specifying array index ranges, including at each level of a multi-dimensional array. By default, only the first 100 leaf values are returned for an array, so for arrays containing large numbers of values, significant numbers would not be viewable by the user. By utilizing this feature, users can reduce the amount of information coming from the debug engine to just that portion of the array they are interested in and see the values, significantly aiding their debugging experience. For illustration, see the discussion regarding FIGS. 14B and 16.

Illustrative features for inclusion in the "feature_name" field value are shown in Table I below:

TABLE I

| feature_name | Field values/description |
|---|---|
| language_supports_threads | [0\|1] |
| language_name | {e.g. CMP, DS2} |
| language_version | language version string |
| encoding | current encoding in use by debug engine 434 |
| protocol_version | 1.0 |
| supports_async | [0\|1] for commands like break |
| data_encoding | encoding of data responses |
| max_data | maximum number of bytes of variable data to initially retrieve |
| max_depth | maximum depth when sending arrays, hash objects, or structures to the debug UI |
| supported_encodings | returns a JSON array of supported encodings that feature msglevel can be tset hrough the encoding gets the volume of messaging debug engine 434 will return |
| msglevel | gets the volume of messaging debug engine 434 will return |
| max_env_depth | maximum number of environments that can be returned by debug engine 434 in a "where" or "env" command |

The debug action may be a "set" command selected by the user to change values of feature settings by debug engine 434. The command syntax may be "set -n -v value" that is generated by the debug UI, where "value" is the value to which to set the indicated feature name or the most recently used feature name if one is not specified. The response generated by debug engine 434 may include the following shown using JSON that is returned to the debug UI by middle tier instance 316:

{
      "response": {
        "command": "set",

```
            "transactionid": 0,
            "currentline": 12,
            "currentfunc": "CMPMAIN",
            "package": "main",
            "status": 0
        }
    }
```

Illustrative features for inclusion in the "feature_name" field value are shown in Table II below:

TABLE II

| feature_name | Field values/description |
|---|---|
| encoding | set the current encoding in use by debug engine 434 |
| max_data | set the maximum number of bytes of variable data to initially retrieve |
| max_depth | set the maximum depth when sending arrays, hash objects, or structures to the debug UI |
| supported_encodings | returns a JSON array of supported encodings that can be set through the encoding feature |
| msglevel | set the volume of messaging debug engine 434 will return where options include informational, notes, warning, error, etc. |
| max_env_depth | set the maximum number of environments that can be returned by debug engine 434 in a "where" or "env" command |

The debug action may be a "go" command selected by the user to instruct debug engine 434 to proceed with execution when it is currently halted. The command syntax may be one of the following that is generated by the debug UI:
  go -l<line_number>: proceed until reaching the specified line number,
  go -o: proceed until returning from the current function/subroutine, or
  go -n<line_count>: proceed until the specified number of lines have been executed.

The response generated by debug engine 434 may include the following shown using JSON that is returned to the debug UI by middle tier instance 316:
```
    {
        "response": {
            "command": "go",
            "transactionid": 0,
            "currentline": 12,
            "currentfunc": "CMPMAIN",
            "package": "main",
            "status": 0,
            "clock": 0.03
        }
    }
```

The "clock" field value indicates the total computation time from the previous halt until the condition specified by the go command is met.

The debug action may be a "pause" command selected by the user to request that debug engine 434 asynchronously attempt to halt execution of modified software to debug 414. The command syntax may be "pause" that is generated by the debug UI. Unlike most of the commands in the command set, the pause command does not have a corresponding response. The response received back from debug engine 434 after successfully halting execution is the go command response.

The debug action may be a "step" command selected by the user to instruct debug engine 434 to proceed with execution of one line of code. The command syntax may be one of the following that is generated by the debug UI:
  step: step over the current line of code, or
  step -t: step into the current line of code if it is a function or subroutine eligible for debugging. If it is not, perform a step over.

The response generated by debug engine 434 may include the following shown using JSON that is returned to the debug UI by middle tier instance 316:
```
    {
        "response": {
            "command": "step",
            "transactionid": 0,
            "currentline": 12,
            "currentfunc": "CMPMAIN",
            "package": "main",
            "status": 0,
            "clock": 0.01
        }
    }
```

The debug action may be a "quit" command selected by the user to request that debug engine 434 terminate debugging and execution of modified software to debug 414. The command syntax may be "quit" that is generated by the debug UI. The response received back from debug engine 434 is forward thinking. That is, the response is an acknowledgement that the quit command has been received, and that debug engine 434 is attempting to comply. As part of complying, debug engine 434 drops the connection with middle tier instance 316 and after dropping the connection, debug engine 434 proceeds with execution until completion. The response generated by debug engine 434 may include the following shown using JSON that is returned to the debug UI by middle tier instance 316 before dropping the connection:
```
    {
        "response": {
            "command": "quit",
            "transactionid": 0,
            "currentline": 3,
            "currentfunc": "coolsum",
            "package": "TESTFUNCS",
            "status": 1
        }
    }
```

The debug action may be a "where" command selected by the user to request that debug engine 434 identify where it is in the call stack. The command syntax may be one of the following that is generated by the debug UI:
  where: return all stack frames in the current call stack, or
  where -d<number>: return the current call stack up to the specified number of stack frames.

Most languages can call functions, methods, or subroutines. When called, these blocks of code can create a new scope of local variables, which debug engine 434 can provide to the debug UI through middle tier instance 316. A series of function calls, e.g. when a function A calls function B calls function C, creates a function call stack. The local variable information and function arguments are visible in the most recently called stack frame. This stack frame is known as the current environment. While program execution is in the current environment, it is possible to view all the stack frames, the environments, and to temporarily set an environment for displaying (or changing) the values of variables as discussed further below. For SAS languages, users work with packages and line numbers within packages. Two functions may have the same name if the source resides in two different packages.

The response generated by debug engine 434 may include the following shown using JSON that is returned to the debug UI by middle tier instance 316:

```
{
  "response" : {
    "command" : "where",
    "transactionid" : 0,
    "currentline" : 3,
    "currentfunc" : "coolsum",
    "package" : "TESTFUNCS",
    "status" : 0,
    "environments" : [
      {
        "level" : 2,
        "package" : "TESTFUNCS",
        "function" : "coolsum",
        "lineno" : 3
      },
      {
        "level" : 1,
        "package" : "main",
        "function" : "CMPMAIN",
        "lineno" : 28
      }
    ]
  }
}
```

The "environments" field value provides a list of the stack levels. Associated with each level is the "level" field value that provides a numerical value indicating the level of the stack, the "package" field value that provides the package name of the corresponding level of the stack, the "function" field value that provides the function name of the package, and the "lineno" field value that provides the line number of the function.

The debug action may be a "env" command selected by the user to request that debug engine 434 change the current environment. Changing the current environment changes the variable and source code scope. The command syntax may be one of the following that is generated by the debug UI:

- env: change the current environment to the top call stack frame for the current debug engine 434,
- env -l<stacklevel>: change the environment to the specified stack frame level for the current debug engine 434. If the stack level argument is not valid, the command has no effect,
- env -g<engineID>: change the current environment to the top call stack frame for debug engine 434 that corresponds to the specified engineID. If the engineID value is invalid, the command has no effect, or
- env -l<stacklevel>-g<engineID>: change the current environment to the specified call stack frame for debug engine 434 that corresponds to the specified engineID. If the engineID value is invalid, the command has no effect. If a valid engineID is provided with an invalid stack level, the environment changes to the top call stack frame for debug engine 434 that corresponds to the specified engineID.

The response generated by debug engine 434 may include the following shown using JSON that is returned to the debug UI by middle tier instance 316:

```
{
  "response" : {
    "command" : "env",
    "transactionid" : 0,
    "currentline" : 1,
```

-continued

```
    "currentfunc" : "CMPMAIN",
    "package" : "main",
    "status" : 0,
    "environments" : [
      {
        "level" : 1,
        "package" : "main",
        "function" : "CMPMAIN",
        "lineno" : 1
      }
    ]
  }
}
```

The debug action may be a "break" command selected by the user to request that debug engine 434 pause execution, respond to middle tier instance 316, and wait for further commands from the debug UI. The command syntax may be one of the following that is generated by the debug UI:

- break -p<package>: pause execution when the specified package is reached and when it is exited,
- break -n<lineno>: pause execution when the specified line number in the specified function of the specified package is reached,
- break -f<function>: pause execution when the specified function of the specified package is reached and when it is exited, or
- break -x<expression>: pause execution when the specified expression is satisfied.

Each break is assigned a unique break point ID. The debug UI uses the break point ID to get, update, or clear a break point except when all is indicated is used. A best effort is made by debug engine 434 to resolve the break point with the given information. Not all information is required. For example, if a package name is omitted, the current package, or current program location is used as the package. A function or subroutine name may be specified, or a line number may be specified instead. The default operation is for the break command to create (or update) the specified break point.

The response generated by debug engine 434 may include the following shown using JSON that is returned to the debug UI by middle tier instance 316:

```
{
  "response" : {
    "command" : "break",
    "transactionid" : 0,
    "currentline" : -1,
    "currentfunc" : "CMPMAIN",
    "package" : "main",
    "status" : 0,
    "break" : [
      {
        "break_id" : 5,
        "state" : 1,
        "package" : "TESTFUNCS",
        "function" : "coolsum",
        "lineno" : 3,
        "expression" : "null",
        "hits" : 0
      }
    ]
  }
}
```

The "break" field value provides a list of break points. Associated with each break point is the "break_id" field value that provides a numeric value indicating the break ID assigned to the break point, the "state" field value that provides an indicator of the state of the break point as either enabled or disabled, the "package" field value that provides the package name of the break point, the "function" field value that provides the function name of the package, the "lineno" field value that provides the line number of the function, the "expression" field value that provides the value of the expression, which is "null" when no expressions are associated with the break point, and the "hits" field value that indicates a number of times that the break point has been triggered.

The debug action may be a "breaklist" command selected by the user to request that debug engine 434 provide a list of all current break points. The command syntax may be "breaklist" that is generated by the debug UI. The response generated by debug engine 434 may include the following shown using JSON that is returned to the debug UI by middle tier instance 316:

```
{
  "response" : {
    "command" : "breaklist",
    "transactionid" : 0,
    "currentline" : 1,
    "currentfunc" : "CMPMAIN",
    "package" : "main",
    "status" : 0,
    "breaklist" : [
      {
        "break_id" : 2,
        "state" : 1,
        "package" : "main",
        "function" : "CMPMAIN",
        "lineno" : 10,
        "expression" : null,
        "hits" : 0
      },
      {
        "break_id" : 3,
        "state" : 1,
        "package" : "main",
        "function" : "CMPMAIN",
        "lineno" : 20,
        "expression" : null,
        "hits" : 0
      },
      {
        "break_id" : 4,
        "state" : 1,
        "package" : "TESTFUNCS",
        "function" : "foo",
        "lineno" : 2,
        "expression" : null,
        "hits" : 0
      },
      {
        "break_id" : 5,
        "state" : 1,
        "package" : "TESTFUNCS",
        "function" : "coolsum",
        "lineno" : 3,
        "expression" : null,
        "hits" : 0
      }
    ]
  }
}
```

The "breaklist" field value provides a list of break points.

The debug action may be a "breakenable" command selected by the user to request that debug engine 434 enable the specified break point. The command syntax may be one of the following that is generated by the debug UI:

breakenable <breakid>: enable break point with the specified break ID, or breakenable -a: enable all break points in the break point list.

The id of the break point(s) that are successfully enabled is returned in the response. The response generated by debug engine 434 may include the following shown using JSON that is returned to the debug UI by middle tier instance 316:

```
{
  "response" : {
    "command" : "breakenable",
    "transactionid" : 0,
    "currentline" : 1,
    "currentfunc" : "CMPMAIN",
    "package" : "main",
    "status" : 0,
    "break" : [
      1
    ]
  }
}
```

The debug action may be a "breakdisable" command selected by the user to request that debug engine 434 disable the specified break point. The command syntax may be one of the following that is generated by the debug UI:

breakdisable -l<breakid>: disable break point with the specified break ID, or breakdisable -a: disable all break points in the break point list.

The id of the break point(s) that are successfully disabled is returned in the response. The response generated by debug engine 434 may include the following shown using JSON that is returned to the debug UI by middle tier instance 316:

```
{
  "response" : {
    "command" : "breakdisable",
    "transactionid" : 0,
    "currentline" : 1,
    "currentfunc" : "CMPMAIN",
    "package" : "main",
    "status" : 0,
    "break" : [
      1
    ]
  }
}
```

The debug action may be a "breakclear" command selected by the user to request that debug engine 434 clear or remove the specified break point. The command syntax may be one of the following that is generated by the debug UI:

breakclear -l<breakid>: remove break point with the specified break ID, or breakclear -a: remove all break points in the break point list.

The id of the break point(s) that are successfully removed is returned in the response. The response generated by debug engine 434 may include the following shown using JSON that is returned to the debug UI by middle tier instance 316:

```
{
  "response" : {
    "command" : "breakclear",
    "transactionid" : 0,
    "currentline" : 1,
    "currentfunc" : "CMPMAIN",
```

```
        "package" : "main",
        "status" : 0,
        "break" : [
            1
        ]
    }
}
```

The debug action may be a "display" command selected by the user to return information related to a specified variable(s) including the value from debug engine 434. The command syntax may be "display -v<variable>", that is generated by the debug UI, where "variable" indicates the variable name. When the variable name is not specified, the most recently used variable is returned. The variable within the scope of the current environment is selected. The response generated by debug engine 434 may include the following shown using JSON that is returned to the debug UI by middle tier instance 316:

```
{
    "response" : {
        "command" : "display",
        "transactionid" : 0,
        "currentline" : 1,
        "currentfunc" : "CMPMAIN",
        "package" : "main",
        "status" : 0,
        "variables" : [
            {
                "name" : "z",
                "type" : "n",
                "kind" : "v",
                "scope" : "local",
                "value" : "null"
            }
        ]
    }
}
```

The "variables" field value provides a list of variable values for an array. Associated with each variable is the "name" field value that provides the name of the variables, the "type" field value that provides an indicator of the type of the variable, the "kind" field value that provides an indicator of the kind of the variable, and the "value" field value that indicates the current value of the variable. For illustration, the type of the variable may be "sas_array", "array", etc. where the sas_array value indicates an array that uses symbols for the child values. For example, for an array named "x" defined as the "sas_array" type would have a child at index 0 named "x1"; whereas, for an array named "x" defined as the "array" type, the child would be represented as "x[1]".

The debug action may be a "whatis" command selected by the user to return information related to a specified variable(s) from debug engine 434. The command syntax may be "whatis -v<variable>", that is generated by the debug UI, where "variable" indicates the variable name. The response generated by debug engine 434 may include the following shown using JSON that is returned to the debug UI by middle tier instance 316:

```
{
    "response" : {
        "command" : "whatis",
        "transactionid" : 0,
```

```
        "currentline" : 1,
        "currentfunc" : "CMPMAIN",
        "package" : "main",
        "status" : 0,
        "variables" : [
            {
                "name" : "z",
                "type" : "n",
                "scope" : "local",
                "kind" : "v"
            }
        ]
    }
}
```

The debug action may be a "source" command selected by the user to request that debug engine 434 return source code from modified software to debug 414. The command syntax may be one of the following that is generated by the debug UI:

source: retrieve the source code for the current environment level, or source -l<envlevel>: retrieve the source code for the specified environment level.

The response generated by debug engine 434 may include the following shown using JSON that is returned to the debug UI by middle tier instance 316:

```
{
    "response" : {
        "command" : "source",
        "transactionid" : 0,
        "currentline" : 1,
        "currentfunc" : "CMPMAIN",
        "package" : "main",
        "status" : 0,
        "sourcecode" : [
            {
                "st" : "CMPMAIN",
                "stnum" : 0
            },
            {
                "st" : " x =1 ;",
                "stnum" : 1
            },
            {
                "st" : " y = x *2",
                "stnum" : 2
            },
            {
                "st" : " z = foo (y);",
                "stnum" : 3
            },
            {
                "st" : "CMPEND",
                "stnum" : 4
            }
        ]
    }
}
```

The "sourcecode" field value provides a list of source code lines. Associated with each source code line is the "st" field value that provides the text of the source code line, and the "stnum" field value that indicates the line number of the source code line.

The debug action may be a "vars" command selected by the user to request that debug engine 434 return sets of variable information from modified software to debug 414. The command syntax may be one of the following that is generated by the debug UI:

vars -s<scopename>: return variables from the specified scope. If none is specified, variables from the current scope are returned, vars -c: return variables that have changed values since the last vars command was issued, or vars -e<envlevel>: return variables from the specified environment level.

One or more of the arguments may be included in the same vars command. Unless the environment level is provided using the -e argument, the current environment level is used for variable scoping. If a scope is not provided using the -s argument, the default scope defined in the initial packet is used. The response generated by debug engine 434 may include the following shown using JSON that is returned to the debug UI by middle tier instance 316:

```
{
    "response" : {
        "command" : "vars",
        "transactionid" : 0,
        "currentline" : 1,
        "currentfunc" : "CMPMAIN",
        "package" : "main",
        "status" : 0,
        "scope" : "local",
        "variables" : [
            {
                "name" : "x",
                "type" : "n",
                "kind" : "v",
                "scope" : "local",
                "value" : 1
            },
            {
                "name" : "y",
                "type" : "c",
                "kind" : "v",
                "scope" : "local",
                "value" : "Y"
            }
        ]
    }
}
```

The "scope" field value provides the current scope for the provided variables.

The debug action may be an "args" command selected by the user to request that debug engine 434 return a list of variables passed as arguments to the current environment level in modified software to debug 414. The command syntax may be "args". The response generated by debug engine 434 may include the following shown using JSON that is returned to the debug UI by middle tier instance 316:

```
{
    "response" : {
        "command" : "args",
        "transactionid" : 0,
        "currentline" : 1,
        "currentfunc" : "foo",
        "package" : "main",
        "status" : 0,
        "variables" : [
            {
                "name" : "x",
                "type" : "n",
                "kind" : "v",
                "value" : 1
            },
            {
                "name" : "y",
                "type" : "c",
```

```
                "kind" : "v",
                "value" : "Y"
            }
        ]
    }
}
```

The debug action may be a "sets" command selected by the user to request that debug engine 434 set values of program variables. The command syntax may be "sets -v<varname>-n<value>-l<envlevel>". If no environment level is specified, the current environment is used. The response generated by debug engine 434 may include the following shown using JSON that is returned to the debug UI by middle tier instance 316:

```
{
    "response" : {
        "command" : "setv",
        "transactionid" : 0,
        "currentline" : 1,
        "currentfunc" : "foo",
        "package" : "main",
        "status" : 0,
        "variable" : [
            {
                "name" : "x",
                "type" : "n",
                "kind" : "v",
                "value" : 1
            }
        ]
    }
}
```

The debug action may be a "watchbreak" command selected by the user to request that debug engine 434 pause the current execution when the value of a specified variable changes. The command syntax may be "watchbreak -v<var>-f <function>-p<package>". If no function or package is specified, the current scope is used. If a function name is specified without a package name, any function matching that name has a valid scope for the watchbreak. The response generated by debug engine 434 may include the following shown using JSON that is returned to the debug UI by middle tier instance 316:

```
{
    "response": {
        "command": "watchbreak",
        "transactionid": 0,
        "currentline": 1,
        "currentfunc": "CMPMAIN",
        "package": "main",
        "status": 0
    }
}
```

The debug action may be a "watchlist" command selected by the user to request that debug engine 434 provide a list of all current watch break points. The command syntax may be "watchlist" that is generated by the debug UI. The response generated by debug engine 434 may include the following shown using JSON that is returned to the debug UI by middle tier instance 316:

```
{
    "response" : {
```

-continued

```
"command" : "watchlist",
"transactionid" : 0,
"currentline" : 1,
"currentfunc" : "CMPMAIN",
"package" : "main",
"status" : 0,
"watch_breaklist" : [
    {
        "break_id" : 2,
        "state" : 1,
        "package" : "main",
        "function" : "CMPMAIN",
        "lineno" : 10,
        "watchbreakvar" : "a",
        "hits" : 0
    },
    {
        "break_id" : 3,
        "state" : 1,
        "package" : "main",
        "function" : "CMPMAIN",
        "watchbreakvar" : "g",
        "hits" : 0
    }
    ]
  }
}
```

The "watch_breaklist" field value provides a list of watch break points. Associated with each watch break point is the "break_id" field value that provides a numerical value indicating the break ID assigned to the break point, the "state" field value that provides an indicator of the state of the break point, the "package" field value that provides the package name of the break point, the "function" field value that provides the function name of the package, the "lineno" field value that provides the line number of the function, the "watchbreakvar" field value that provides the name of variable, and the "hits" field value that indicates a number of times that the break point has been triggered.

The debug action may be a "watchenable" command selected by the user to request that debug engine 434 enable the specified watch break point. The command syntax may be one of the following that is generated by the debug UI:

watchenable -l<breakid>: enable watch break point with the specified break ID, or watchenable -a: enable all watch break points in the break point list.

The id of the watch break point(s) that are successfully enabled is returned in the response. The response generated by debug engine 434 may include the following shown using JSON that is returned to the debug UI by middle tier instance 316:

```
{
    "response" : {
        "command" : "watchenable",
        "transactionid" : 0,
        "currentline" : 1,
        "currentfunc" : "CMPMAIN",
        "package" : "main",
        "status" : 0,
        "break" : [
            1
        ]
    }
}
```

The debug action may be a "watchdisable" command selected by the user to request that debug engine 434 disable the specified watch break point. The command syntax may be one of the following that is generated by the debug UI:

watchdisable <breakid>: disable watch break point with the specified break ID, or watchdisable -a: disable all watch break points in the break point list.

The id of the watch break point(s) that are successfully disabled is returned in the response. The response generated by debug engine 434 may include the following shown using JSON that is returned to the debug UI by middle tier instance 316:

```
{
    "response" : {
        "command" : "watchdisable",
        "transactionid" : 0,
        "currentline" : 1,
        "currentfunc" : "CMPMAIN",
        "package" : "main",
        "status" : 0,
        "break" : [
            1
        ]
    }
}
```

The debug action may be a "watchclear" command selected by the user to request that debug engine 434 clear or remove the specified watch break point. The command syntax may be one of the following that is generated by the debug UI:

watchclear <breakid>: remove watch break point with the specified break ID, or watchclear -a: remove all watch break points in the break point list.

The id of the watch break point(s) that are successfully removed is returned in the response. The response generated by debug engine 434 may include the following shown using JSON that is returned to the debug UI by middle tier instance 316:

```
{
    "response" : {
        "command" : "watchclear",
        "transactionid" : 0,
        "currentline" : 1,
        "currentfunc" : "CMPMAIN",
        "package" : "main",
        "status" : 0,
        "break" : [
            1, 2, 3
        ]
    }
}
```

The debug action may be a "getroutines" command selected by the user to request that debug engine 434 retrieve the names and packages of all methods and functions within the context of modified software to debug 414. The command syntax may be one of the following that is generated by the debug UI:

getroutines: get all methods and functions, getroutines -m: get all methods, or getroutines -f: get all functions.

The response generated by debug engine 434 may include the following shown using JSON that is returned to the debug UI by middle tier instance 316:

```
{
  "response" : {
    "command" : "getroutines",
    "transactionid" : 0,
    "currentline" : 1,
    "currentfunc" : "CMPMAIN",
    "package" : "main",
    "status" : 0,
    "methods" : [
    ],
    "functions" : [
      {
        "package" : "TESTFUNCS",
        "function" : "foo"
      },
      {
        "package" : "TESTFUNCS",
        "function" : "times"
      },
      {
        "package" : "TESTFUNCS",
        "function" : "coolsum"
      }
    ]
  }
}
```

The "methods" field value provides a list of methods, if any. The "functions" field value provides a list of functions, if any. Associated with each function is the "package" field value that provides the package name of the function, and the "function" field value that provides the function name.

The debug action may be a "getmethsrc" command selected by the user to request that debug engine 434 retrieve the program source code for a specified method. The command syntax may be "getmethsrc -m<method>". If no method is specified, the current scope is used. The response generated by debug engine 434 may include the following shown using JSON that is returned to the debug UI by middle tier instance 316:

```
{
  "response" : {
    "command" : "getmethsrc",
    "transactionid" : 0,
    "currentline" : 1,
    "currentfunc" : "CMPMAIN",
    "package" : "main",
    "status" : 0,
    "methsource" : [
      {
        "st" : "method foo;",
        "stnum" : 1
      },
      {
        "st" : "b =100;",
        "stnum" : 2
      },
      {
        "st" : "return(a*b);",
        "stnum" : 3
      },
      {
        "st" : "endsub;",
        "stnum" : 4
      }
    ]
  }
}
```

The "methsource" field value includes a list of the lines of the source code of the method.

The debug action may be a "breakroutines" command selected by the user to request that debug engine 434 sets a break point on the first executable line of the specified method and function within the context of modified software to debug 414. The command syntax may be one of the following that is generated by the debug UI:

breakroutines: set a break point on the first line of all methods and functions, breakroutines -m: set a break point on the first line of all methods, or breakroutines -f: set a break point on the first line of all functions.

The response generated by debug engine 434 may include the following shown using JSON that is returned to the debug UI by middle tier instance 316:

```
{
  "response" : {
    "command" : "breakroutines",
    "transactionid" : 0,
    "currentline" : 12,
    "currentfunc" : "CMPMAIN",
    "package" : "main",
    "status" : 0,
    "breaks" : [
      {
        "break_id" : -3,
        "state" : 1,
        "package" : "TESTFUNCS",
        "function" : "times",
        "lineno" : 2,
        "expression" : "x>10",
        "hits" : 0
      },
      {
        "break_id" : -3,
        "state" : 1,
        "package" : "TESTFUNCS",
        "function" : "foo",
        "lineno" : 2,
        "expression" : "(a<10) and (b>4)",
        "hits" : 0
      },
      {
        "break_id" : -3,
        "state" : 1,
        "package" : "TESTFUNCS",
        "function" : "coolsum",
        "lineno" : 3,
        "expression" : "(s<exp(5))",
        "hits" : 0
      }
    ]
  }
}
```

In the illustration above, the break_id field values are negative indicating that the breakpoint could not be set. The break_id field values are used to communicate which case rendered the breakpoint invalid. For illustration, for three cases, the break_id field values may be used such that a value of −1 indicates the line does not exist, a value of −2 indicates the source (package/function) does not exist, and a value of −3 indicates the breakpoint is a duplicate of an existing breakpoint.

These cases typically only occur when breakpoints are being reapplied to a new program being debugged in the same user session, or if the user imports breakpoints from an external file. It can also happen if the user tries to set a breakpoint from the command line in the UI Referring to FIG. 11A, a zoomed view of URL textbox 1002 and of toolbar 1004 is shown. The URL for accessing the debug UI may be shown in URL textbox 1002. Toolbar 1004 may include a status indicator 1100, a "go" button 1102, a step over button 1104, a step into button 1106, a step out of button 1108, a quit button 1110, a debug option string button 1112, a panels drop down list 1114, and an ellipse button 1116. Status indicator 1100 may indicate a current status of the debug process, for example, as a result of a status command response. Selection of go button 1102 may trigger issuance of a go command. When the debug process is executing, go button 1102 may be replaced with a pause button. Selection of step over button 1104, step into button 1106, or step out of button 1108 may trigger issuance of a step command. Selection of quit button 1110 may trigger issuance of a quit command. Selection of debug option string button 1112 may trigger a dialog containing a debug option string (specifying host, port, etc.) text box in which the user can enter the host/port for debug engine 434 to contact middle tier instance 316 that is to be added to the code being executed. Selection of panels drop down list 1114 may present of list of the panels that can be toggled on or off for display. For example, one or more of functions/methods list 1006, code window 1008, call stack window 1010, break point window 1012, variables window 1014, watch variable window 1016, console window 1018, and command line text box 1020 may be turned on or off for display in debug UI 1000.

Figure 11A:
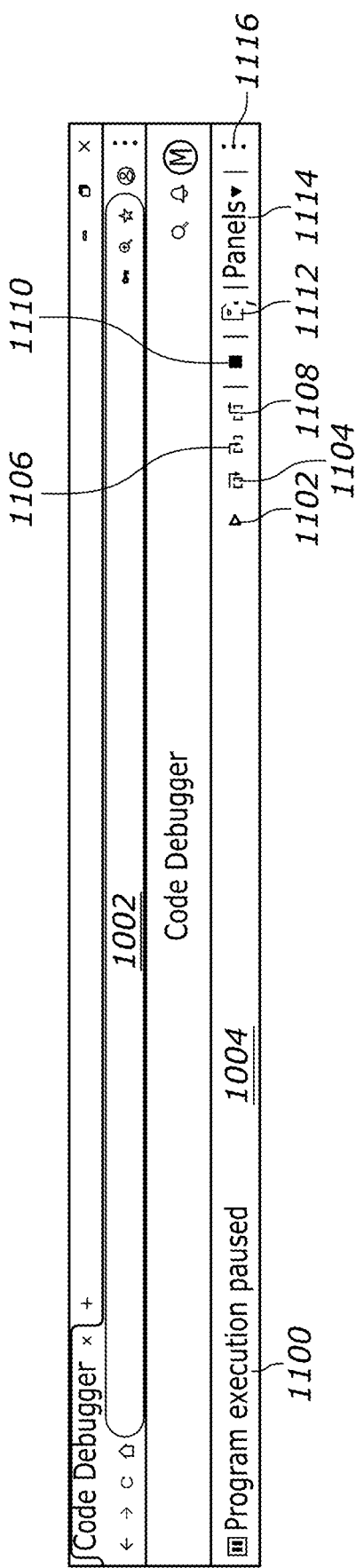
Figure 11B:
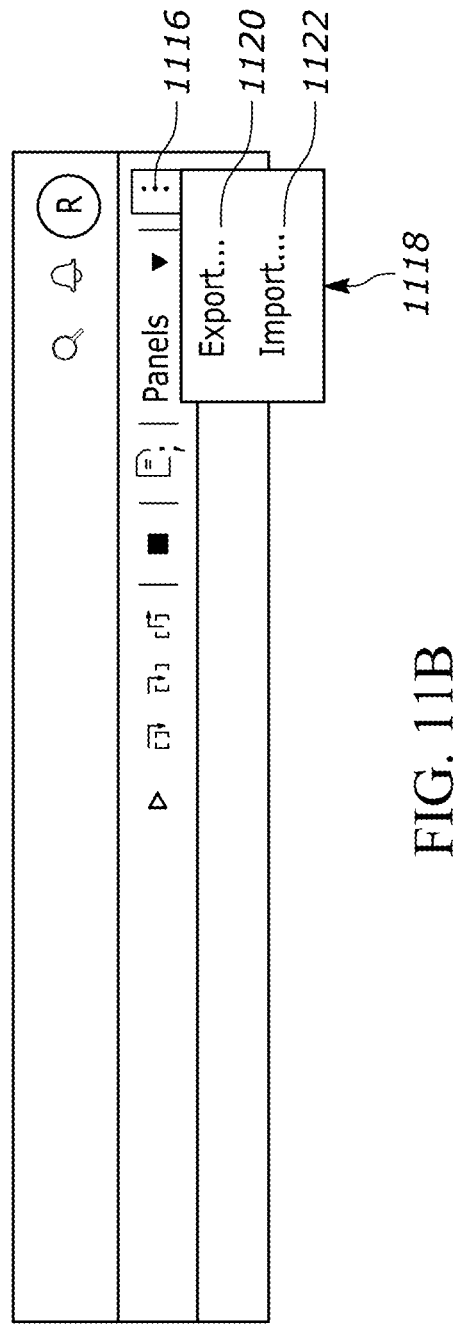
Figure 17:
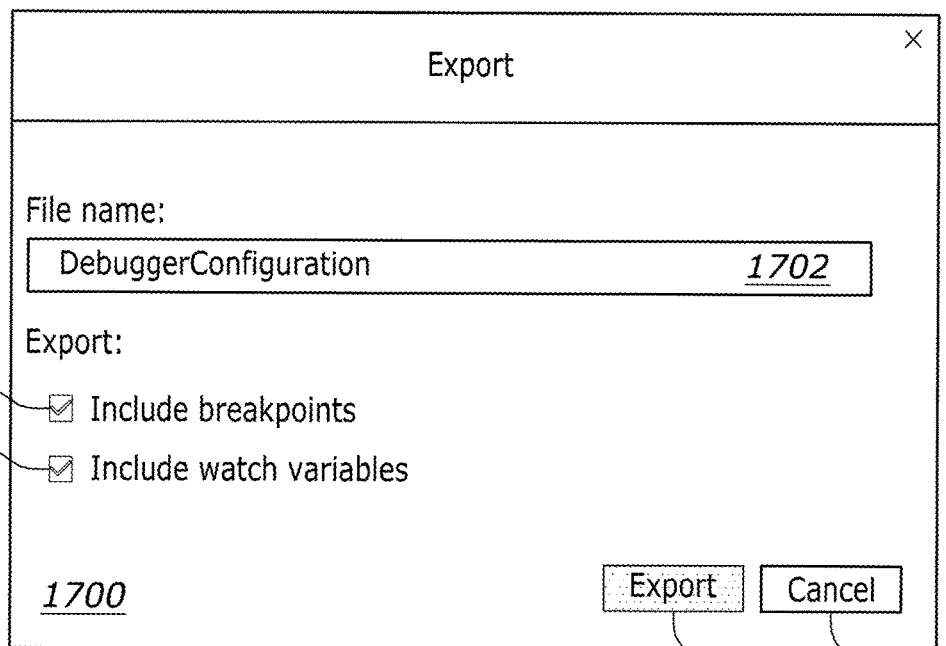

Referring to FIG. 11B, a zoomed view of a right edge of toolbar 1004 is shown after selection of ellipse button 1116. Selection of ellipse button 1116 provides access to additional command options. For example, ellipse button 1116 provides access to a menu 1118 that includes an export menu item 1120 and an import menu item 1122. Selection of export menu item 1120 allows the user to export a debug configuration from the current session to an external file. For example, referring to FIG. 17, selection of export menu item 1120 triggers creation and presentation of an export window 1700. Export window 1700 may include a filename text box 1702, a breakpoint inclusion check box 1704, a watch variable inclusion check box 1706, an export button 1708, and a cancel export button 1710. The user enters a desired filename for the exported debug configuration in filename text box 1702. The exported debug configuration can optionally include or exclude any set breakpoints and/or any set watch variables using breakpoint inclusion check box 1704 and watch variable inclusion check box 1706, respectively. User selection of export button 1708 closes export window 1700 and triggers creation of the exported debug configuration having the desired filename entered by the user in filename text box 1702. User selection of cancel export button 1710 closes export window 1700 and returns control to toolbar 1004 without exporting the debug configuration.

Figure 18:
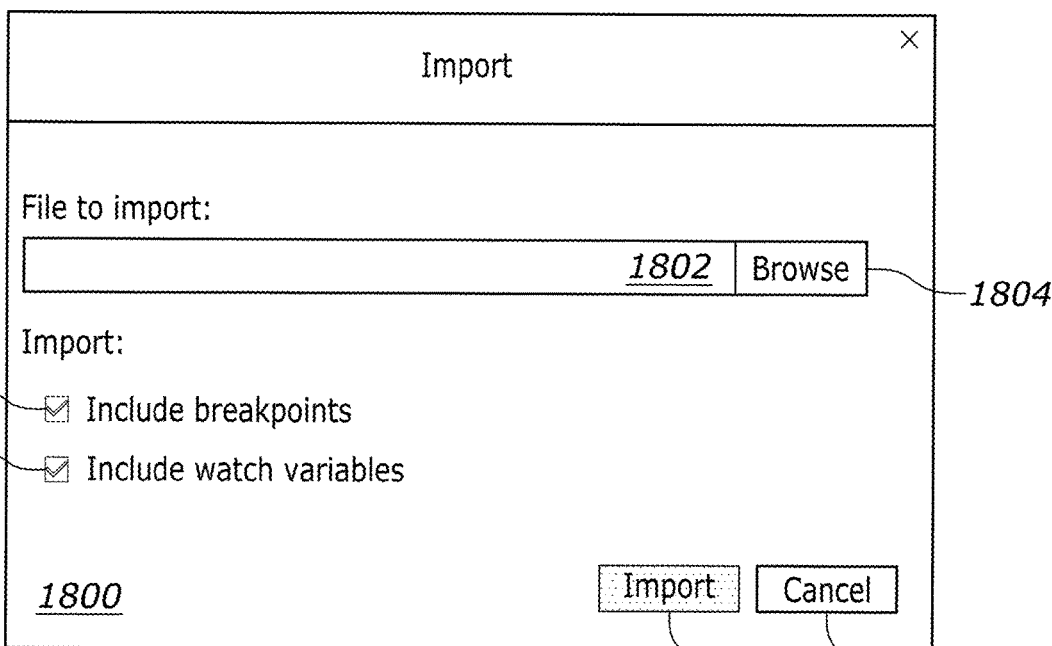

Selection of import menu item 1122 allows the user to import a debug configuration into the current session from an external file, which can be useful when repeatedly debugging the same code over multiple user sessions. For example, referring to FIG. 18, selection of import menu item 1122 triggers creation and presentation of an import window 1800. Import window 1800 may include a filename text box 1802, a browse button 1804, a breakpoint inclusion check box 1806, a watch variable inclusion check box 1808, an import button 1810, and a cancel import button 1812. The user enters a previously exported debug configuration in filename text box 1702. Alternatively, the user can select browse button 1804 to select the previously exported debug configuration from where it was saved using filename text box 1702. The import debug configuration can optionally include or exclude any set breakpoints and/or any set watch variables using breakpoint inclusion check box 1806 and watch variable inclusion check box 1808, respectively. User selection of import button 1810 closes import window 1800, triggers a read of the debug configuration having the filename entered/selected by the user in filename text box 1802, and updates debug UI 1000 to a state saved when the debug configuration was exported. User selection of cancel import button 1812 closes import window 1800 and returns control to toolbar 1004 without importing the debug configuration.

Referring to FIG. 12, a zoomed view of functions/methods list 1006 and code window 1008 is shown. Functions/methods list 1006 may include a filter text box 1200, a function drop down selector 1202, a functions indicator 1203, a methods indicator 1204, a functions list 1206, and an active function 1208. Text typed into filter text box 1200 can be used to narrow the list of functions and/or methods shown below. Function drop down selector 1202 can be toggled to display or close functions list 1206 and is associated with functions indicator 1203. Functions list 1206 includes a list of currently displayable function source code. Active function indicator 1208 is highlighted to indicate that code window 1008 is currently showing that functions source code. Though not shown in the illustrative embodiment, similar interface components may be associated with methods indicator 1204.

Code window 1008 may include a first code tab 1210, a second code tab 1212, and a third code tab 1214. Any number of tabs may be included based on the source code that has been retrieved. Each of first code tab 1210, second code tab 1212, and third code tab 1214 may indicate a name of the source code.

Code window 1008 further may include a line number window that shows a line number associated with each line of the source code and a source code window that shows the source code lines 1220. The user can toggle between source code listings presented in code window 1008 by selecting a different tab. An active line indicator 1222 and an associated active source code line indicator 1224 indicate the source code currently being executed.

Figure 13:
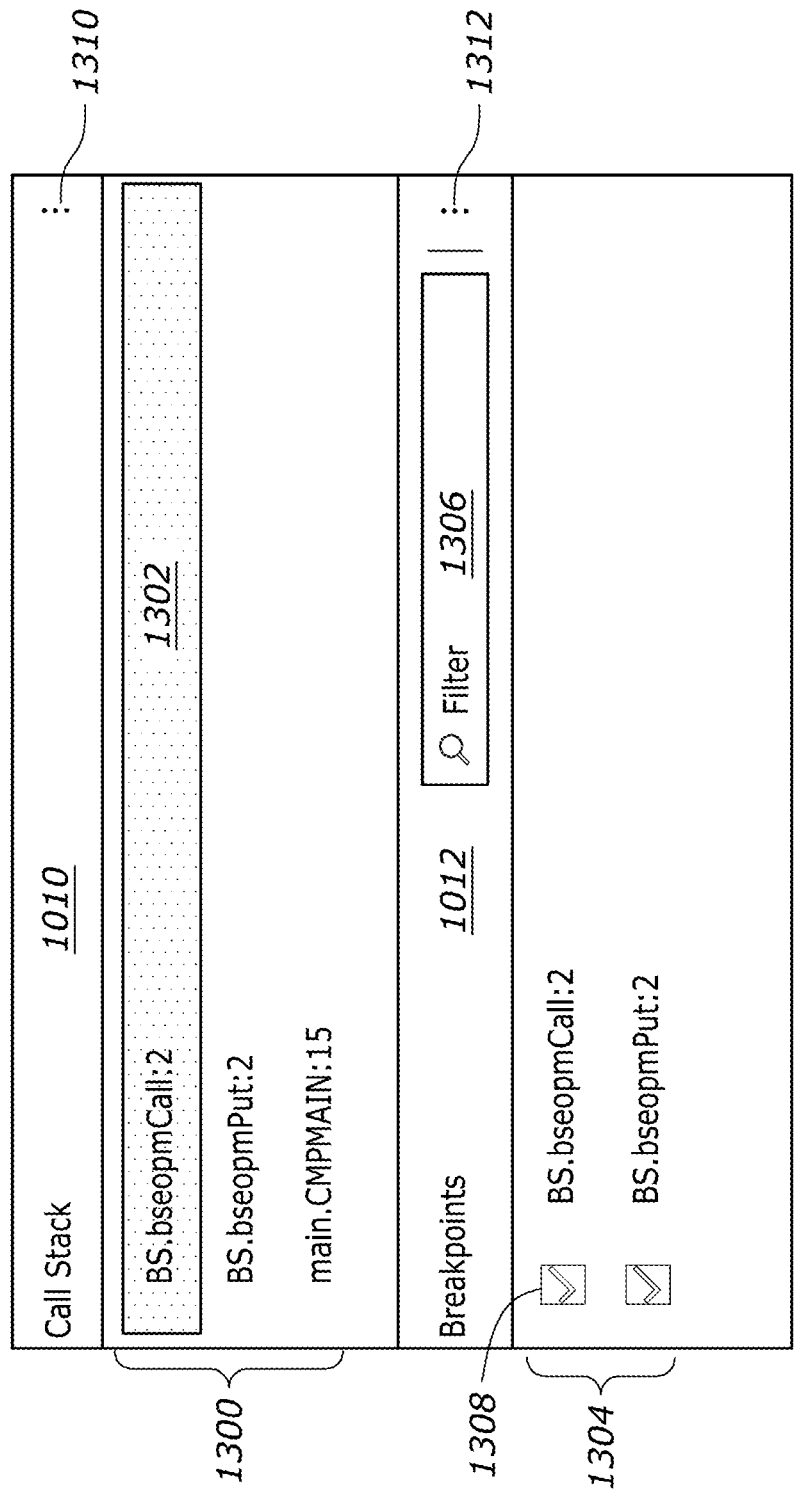

Referring to FIG. 13, a zoomed view of call stack window 1010 and break point window 1012 is shown. Call stack window 1010 may include a stack frame list 1300 and a stack ellipse indicator 1310. Stack ellipse indicator 1310 may provide access to common panel actions such as minimize/maximize. An active stack frame indicator 1302 indicates a currently active stack frame. The parameters in stack frame list 1300 may include the package name, the function name, and the line number.

Break point window 1012 may include a break point list 1304, a break point filter text box 1306, and a break point ellipse indicator 1312. Text typed into break point filter text box 1306 can be used to narrow the list of break points shown in break point list 1304. An enable indicator 1308 indicates that the associated break point is enabled. Though not shown, a disable indicator may indicate that the associated break point is disabled. Break point ellipse indicator 1312 may provide access to common panel actions such as minimize/maximize, enable break point, disable break point, delete break point, etc.

Referring to FIG. 14A, a zoomed view of variables window 1014 and watch variable window 1016 is shown. Variables window 1014 may include a variable filter text box 1400, a local tab 1402, a global tab 1404, and a variable list ellipse indicator 1414. Variable list ellipse indicator 1414 may provide access to common panel actions such as minimize/maximize. A variable list 1412 is associated with each tab selected. Associated with each variable included in variable list 1412 is a variable name column 1406, a variable type column 1408, and a variable value column 1410. A vertical scroll bar 1416 may be presented to allow the user to scroll through variable list 1412 when the entire list cannot be presented in variables window 1014. Though not shown in each list, a corresponding vertical or horizontal scroll bar may be presented as needed.

Watch variable window 1016 may include a watch variable list 1432, a watch variable filter text box 1418, and a watch variable ellipse indicator 1424. Text typed into watch variable filter text box 1418 can be used to narrow the list of watch variables shown in watch variable list 1432. Associated with each variable included in watch variable list 1432 is a variable name column 1426, a variable type column 1428, and a variable value column 1430. Watch variable window 1016 further may include an add watch variable button 1420 and a clear watch variable button 1422 to create and delete watch variables. Watch variable window 1016 provides a method to present the variable set that the user is most interested in tracking. The values for the variables displayed in watch variable list 1432 change as the program executes and modifies the variable values.

Referring to FIG. 14B, a zoomed view of variables window 1014 is shown with a variable "zz" that is an array. To view the content of a variable that is an array, the user can, for example, "right-click" using mouse 214 that triggers presentation of an array menu 1434. Array menu 1434 may include an add to watch list menu item 1436, an inspect array menu item 1438, a select all menu item 1440, and a clear selections menu item 1442. Selection of add to watch list menu item 1436 may add the associated variable to the watch list resulting in its inclusion in watch variable list 1432. Selection of select all menu item 1440 may select all of the entries in the array. Selection of clear selections menu item 1442 may unselect any selected array entries.

Figure 16:
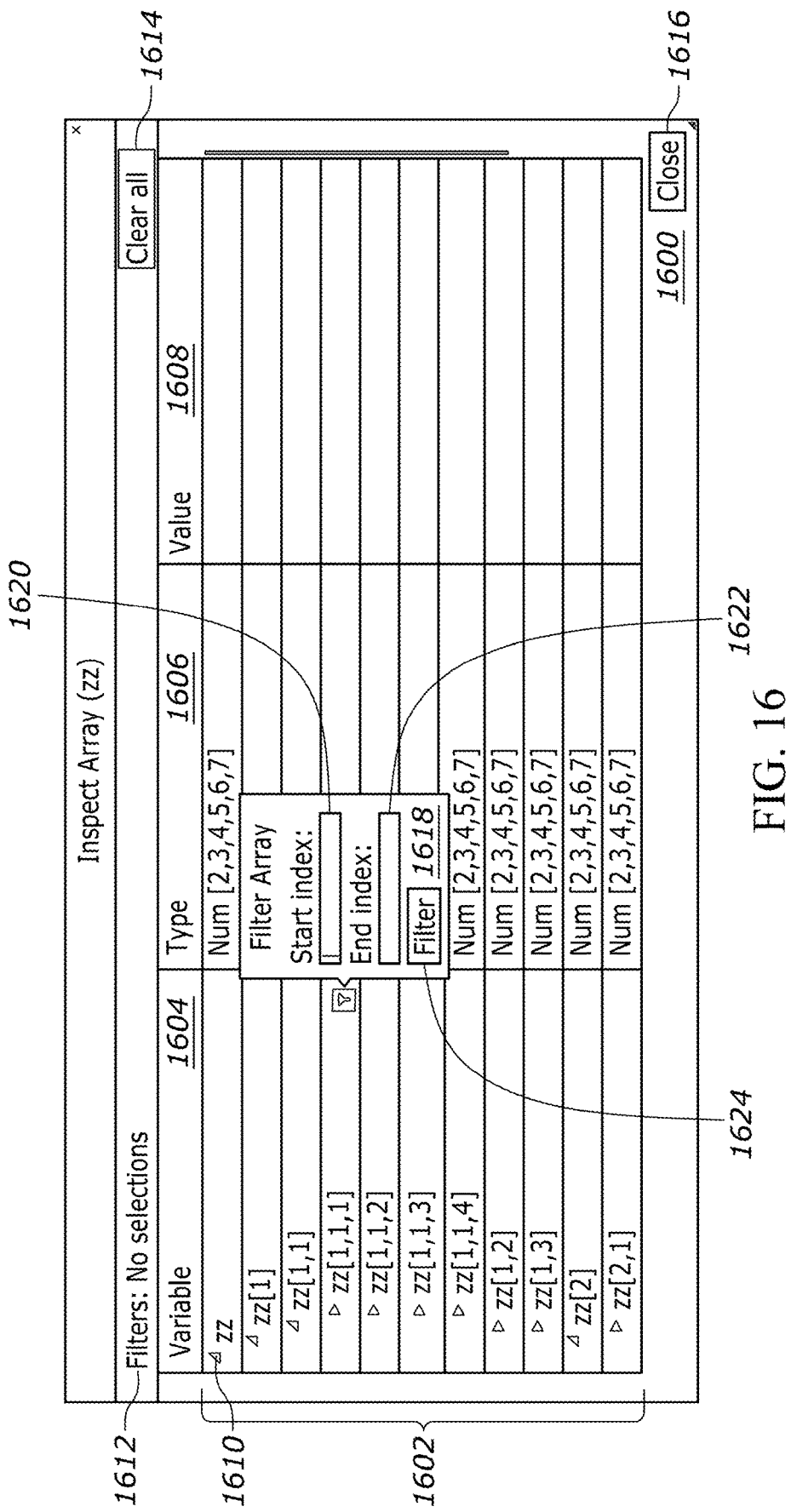

Selection of inspect array menu item 1438 may trigger presentation of an array inspect window 1600 shown referring to FIG. 16. Referring to FIG. 16, array inspect window 1600 may include an array tree list 1602. Associated with each array entry included in array tree list 1602 is a variable name column 1604, a variable type column 1606, and a variable value column 1608. Each item in array tree list 1602 includes an open/close tree selector 1610. Selection of open/close tree selector 1610 when closed triggers presentation of a next level of one or more rows of the array where each level is associated with successive columns of the array. Selection of open/close tree selector 1610 when open triggers closing of the next level so that the next level of the array is not shown in array tree list 1602. The open/close tree selector 1610 is not associated with a row of array tree list 1602 that indicates a specific array value at the lowest level.

Inspect window 1600 may further include a filter button 1612, a clear all button 1614, and a close button 1616. Selection of filter button 1612 triggers presentation of filter window 1618. Filter window 1618 may include a start index text box, a stop index text box 1622, and a filter button 1624. The user may enter a start index for array entries of interest into start index text box 1620, and the user may enter a stop index for array entries of interest into stop index text box 1622. When no entry is included in either start index text box 1620 or in stop index text box 1622, the first and last indices are used automatically. Selection of filter button 1624 closes filter window 1618 and changes array tree list 1602 such that it only includes the values associated with the index values defined in start index text box 1620 and/or stop index text box 1622. Selection of clear all button 1614 clears any filters that have been set. Selection of close button 1616 closes array inspect window 1600.

Figure 15:
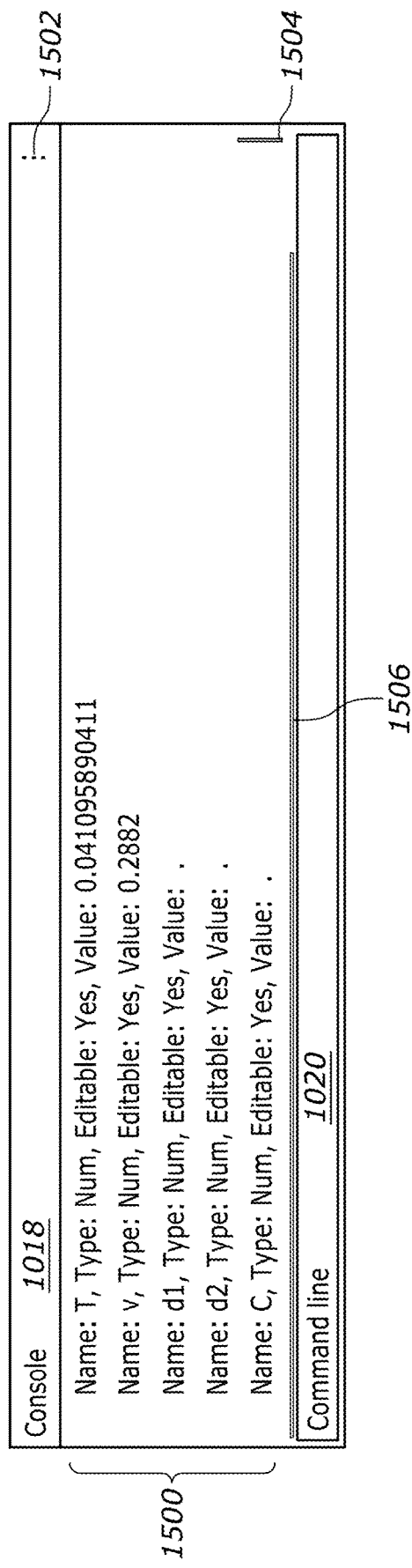

Referring to FIG. 15, a zoomed view of console window 1018 and command line text box 1020 is shown. Console window 1018 may include a list 1500, a console ellipse indicator 1502, a vertical scroll bar 1504, and a horizontal scroll bar 1506. Console ellipse indicator 1502 may provide access to common panel actions such as minimize/maximize. Console window 1018 presents formatted response data returned upon completion of a debug command. Console window 1018 is primarily used as an aid for users who wish to interact with debug UI 1000 using commands entered into command line text box 1020 instead of using the buttons/menus provided by debug UI 1000 though console window 1018 does display output produced from button/menu clicks in debug UI 1000 because all command responses are formatted the same whether issued through command line text box 1020 or user interaction with UI components.

Middle tier instance 316 manages the current connections with all of the debug engines 434 and provides the information to debug UI 1000 in response to a REST API call from debug UI 1000. Included with each response is the corresponding engine ID, node, thread number, and state information for each connection. A UI panel (not shown) shows a table of all connected debug engines, with each row being one connected debug engine 434. The node and thread, along with the state information regarding the current state of execution of each debug engine 434, is included in this table. The engine currently being debugged is highlighted in this table. Debug UI 1000 internally maintains a record of the associated engine ids for each connection in the table. Unless a -g<engineid> is explicitly specified, debug UI 1000 appends any entered commands with -g<id>, where id is the engine ID for the engine currently being debugged.

Referring again to FIG. 6, in an operation 612, the debug command is sent to middle tier instance 316.

In an operation 614, a response to the debug command is received from middle tier instance 316. In an illustrative embodiment, the debug UI polls middle tier instance 316 for responses using one of the REST API endpoints.

In an operation 616, the response is processed.

In an operation 618, the debug UI is updated as a result of the processed response, and processing continues in operation 610 until the debug process is stopped. For example, the debug process may be stopped when execution of modified software to debug 414 is complete or when the user selects quit button 1110.

Figure 7:
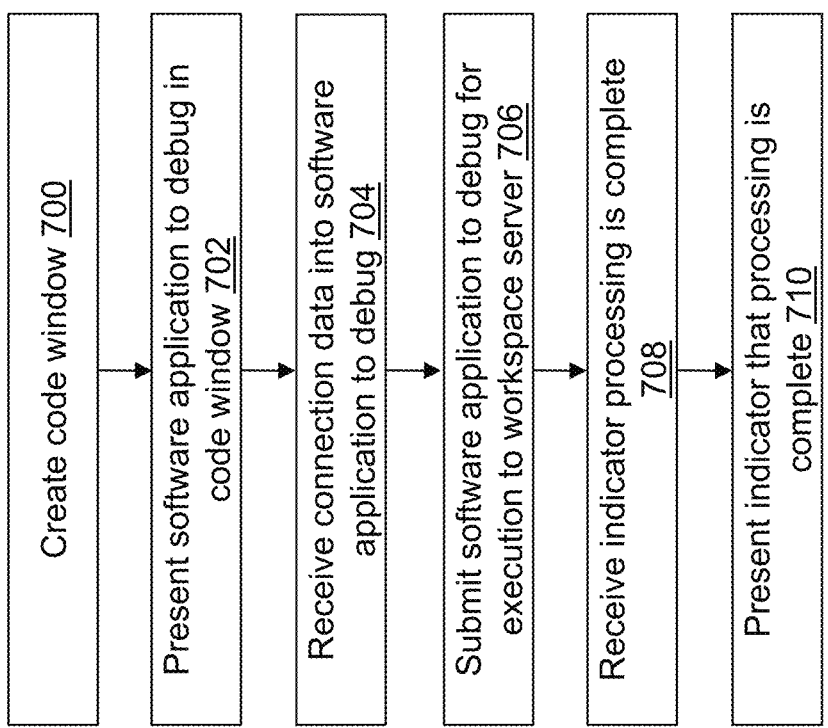
FIG. 7 depicts a flow diagram illustrating examples of second operations performed by the user device of FIG. 2 in accordance with an illustrative embodiment.

Referring to FIG. 7, example second operations associated with software development application 224 are described. Additional, fewer, or different operations may be performed depending on the embodiment. The order of presentation of the operations of FIG. 7 is not intended to be limiting. A user can interact with one or more UI windows presented to the user in display 216 under control of software development application 224 independently or through a browser application in an order selectable by the user. Although some of the operational flows are presented in sequence, the various operations may be performed in various repetitions, concurrently, and/or in other orders than those that are illustrated. For example, a user may execute software development application 224, which causes presentation of a first UI window, which may include a plurality of menus and selectors such as drop-down menus, buttons, text boxes, hyperlinks, etc. associated with software development application 224 as understood by a person of skill in the art In an operation 700, a code window is created into which the user may develop or import software application to debug 226.

In an operation 702, software application to debug 226 is presented in the code window.

In an operation 704, connection data 314 is received into software application to debug 226. For example, the host name, the security token, and the second predefined port number for accessing middle tier instance 316 is provided to debug engine 434 using a predefined language interface such as an option declared in a program statement. For example, the security token may be a unique 32-character hexadecimal token.

In an operation 706, software application to debug 226 is submitted for execution to workspace server 106.

In an operation 708, an indicator that processing is complete is received.

In an operation 710, the indicator that processing is complete is presented in the created code window.

Figure 8:
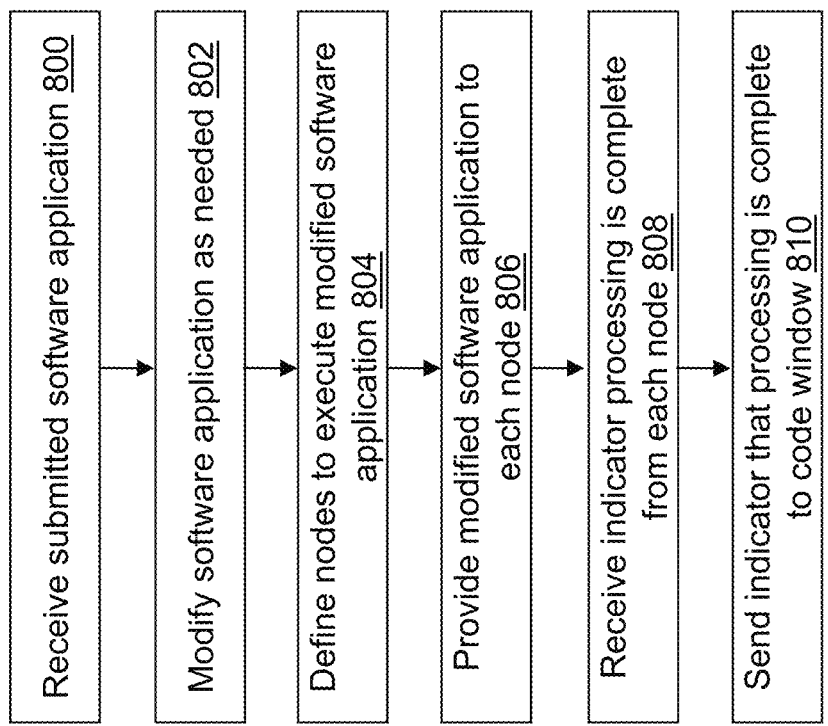
FIG. 8 depicts a flow diagram illustrating examples of operations performed by the workspace server of FIG. 4A in accordance with an illustrative embodiment.

Referring to FIG. 8, a flow diagram illustrating examples of operations performed by workspace server device 106 is shown in accordance with an illustrative embodiment. Additional, fewer, or different operations may be performed depending on the embodiment. The order of presentation of the operations of FIG. 8 is not intended to be limiting. Workspace server device 106 may be configured in a single-machine mode or a distributed mode. Single-machine mode is a computing model in which multiple processors or multiple cores are controlled by a single operating system and can access shared resources, such as disks and memory. Single-machine mode refers to an application running multiple concurrent threads on a multi-core machine to take advantage of parallel execution on workspace server device 106. Distributed mode utilizes worker system 108 comprised of a plurality of worker computing devices that each may execute the application using multiple concurrent threads.

In an operation 800, the submitted software application to debug 226 is received from the created code window under control of software development application 224.

In an operation 802, the received software application to debug 226 is modified as needed and stored in modified software to debug 414. For example, though software application to debug 226 is not modified, the instructions included in software application to debug 226 may be supplemented with other code generated based on the software platform responsible for controlling execution of the instructions included in software application to debug 226. For example, the execution may be in a grid environment such that other code provides the distributed execution instructions that are needed. For illustration, the functions and methods in software application to debug 226 may be included as part of a procedure call such as the COMPILE procedure provided by SAS© High-Performance Risk. The HPRISK procedure provides a different language of instructions that perform operations on the grid. The COMPILE procedure functions and methods are sent to the grid with the HPRISK procedure operations as part of the overall environment and are executed in parallel on the grid.

In an operation 804, nodes to execute modified software to debug 414 are defined based on whether workspace server 106 is in single machine mode or distributed mode. For example, if workspace server 106 is in single machine mode, the nodes are the threads of workspace server 106 selected to execute modified software to debug 414 in parallel on workspace server 106. For example, if workspace server 106 is in distributed mode, the nodes are each thread of each worker computing device of worker system 108 selected to execute modified software to debug 414 in parallel.

In an operation 806, modified software to debug 414 is provided to each defined node.

In an operation 808, the indicator that processing is complete is received.

In an operation 810, the indicator that processing is complete is sent to the created code window.

Figure 9:
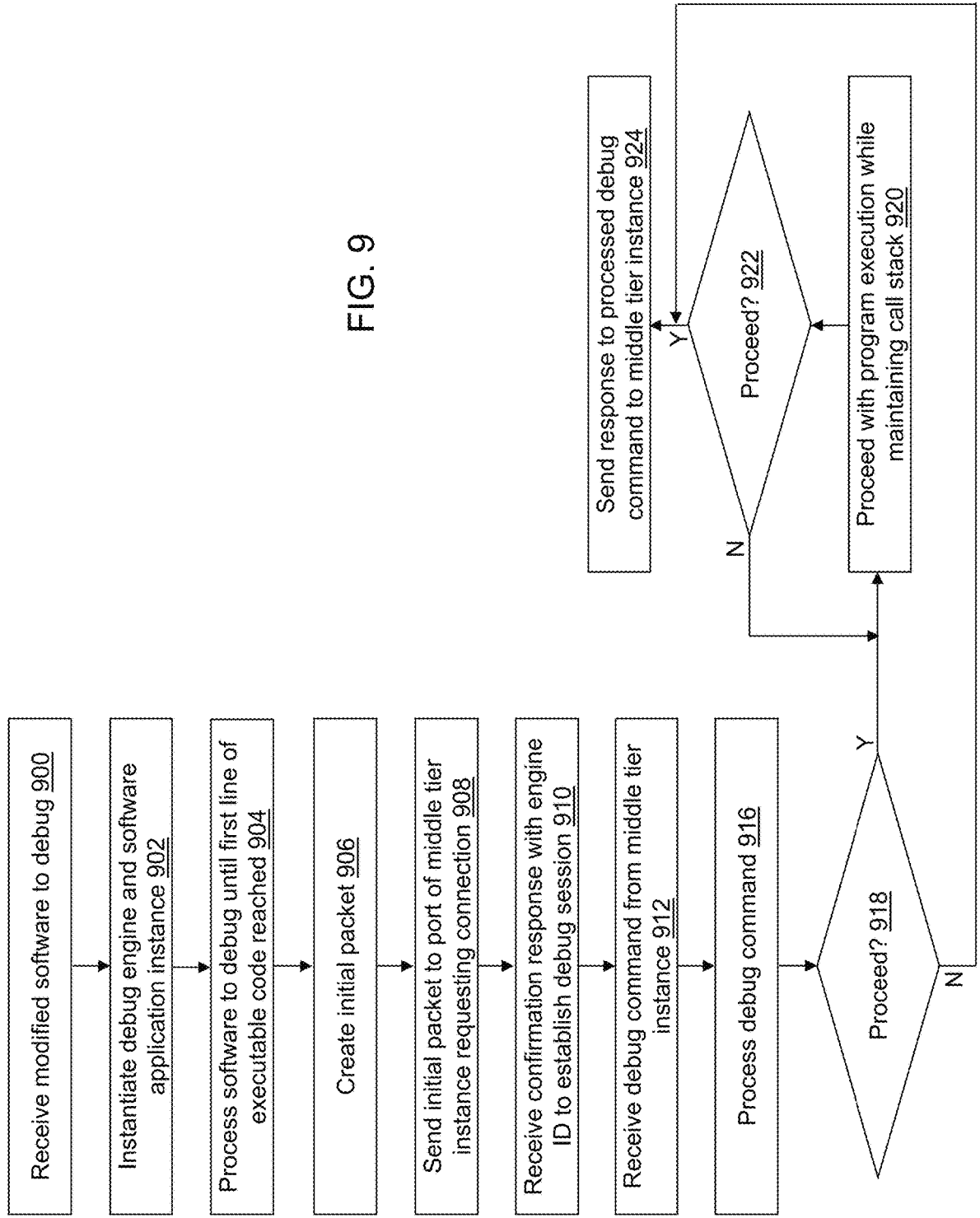
FIG. 9 depicts a flow diagram illustrating examples of operations performed by the worker device of FIG. 4B in accordance with an illustrative embodiment.
Figure 10:
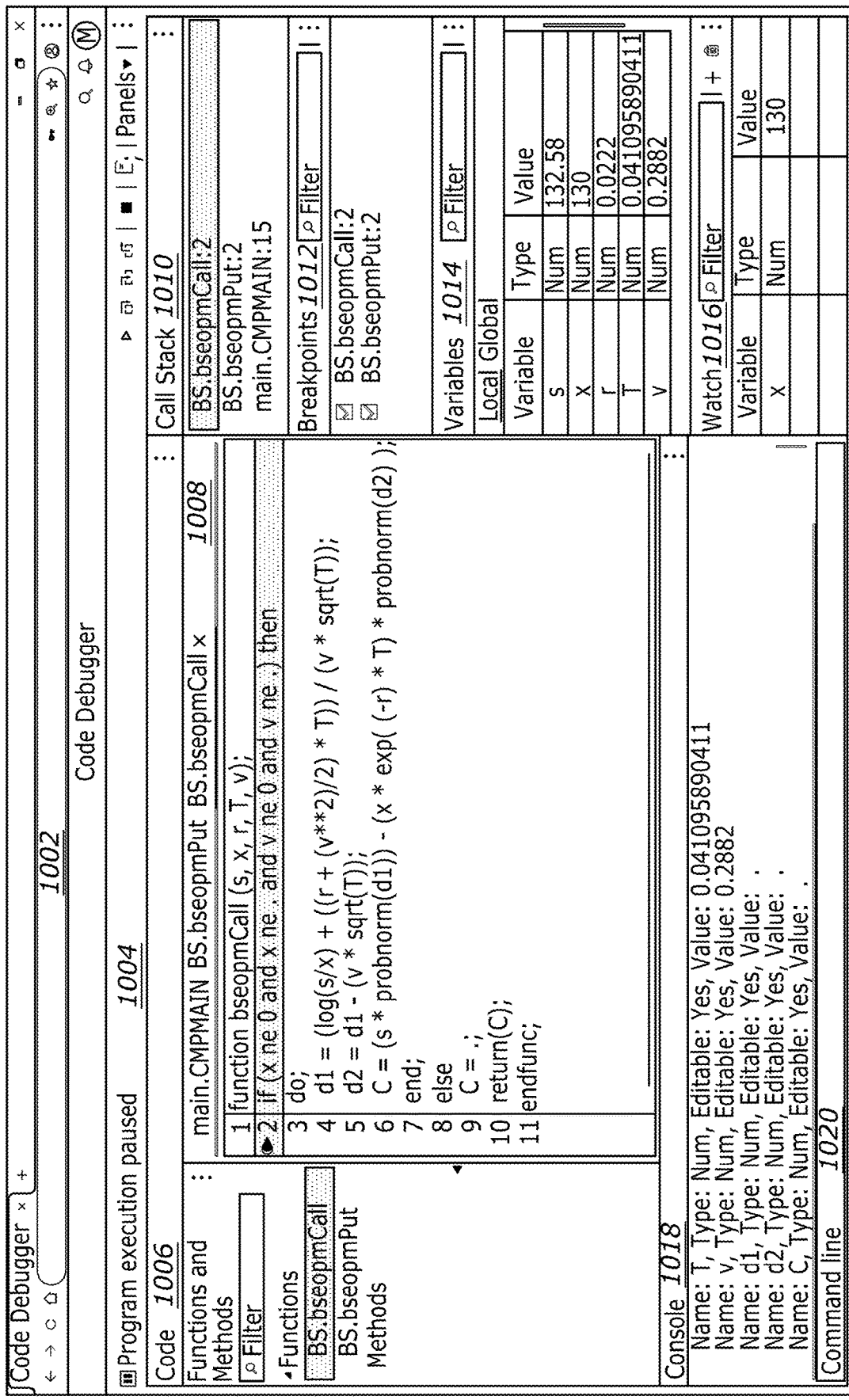

Referring to FIG. 9, example operations associated with code execution application 432 are described. Additional, fewer, or different operations may be performed depending on the embodiment. The order of presentation of the operations of FIG. 9 is not intended to be limiting. When workspace server device 106 is operating in single-machine mode, code execution application 432 may be executing on each thread of a plurality of threads of workspace server device 106. When workspace server device 106 is operating in distributed mode, code execution application 432 may be executing on each thread of a plurality of threads of each worker computing device 108-1, . . . , 108-M of worker system 108.

In an operation 900, modified software to debug 414 is received from workspace server 106.

In an operation 902, a debug engine and a software application instance are instantiated as co-processes on a thread allocated from an available thread pool to each defined node where the thread pool may be on different worker computing devices when workspace server device 106 is operating in distributed mode. The allocated thread manages execution of modified software to debug 414 by the software application instance and the debug process by debug engine 434 as well as communication with middle tier instance 316.

In an operation 904, modified software to debug 414 is processed until a first line of executable code is reached.

In an operation 906, the initial packet is created. The initial packet may be formatted using any format understood by middle tier instance 316. For illustration, the initial packet is shown below using JSON:

{
  "init": {
    "dbgid": "DBGID",
    "session": "dbg_sessionId",
    "uuid": "23aa2b933d7f8921357db6910ab842be",
    "port": 54760,
    "language": "CMP",
    "protocol_version": "1.0",
    "engine_version": "1.0",
    "scopes": ["local", "system", "global" ],
    "default_scope": "local",
    "encrypted": 0,
    "threadid": 1,
    "noderank": 64
  }
}

The "dbgid" field value provides an identifier for the debug process, the "session" field value provides an identifier for the debug session, the "session" field value provides an identifier for the debug session, the "uuid" field value provides the security token embedded in modified software to debug 414, the "port" field value provides the second predefined port number, the "language" field value provides an identifier of the language of modified software to debug 414, the "protocol_version" field value provides an identifier of the protocol version associated with a format of the response from debug engine 434, the "engine_version" field value provides an identifier of the engine version used by debug engine 434, the "scopes" field value provides a list of the possible scopes of modified software to debug 414, the "default_scope" field value provides an indicator of a default scope selected from the list of possible scopes, the "encrypted" field value provides an indicator of whether the traffic is encrypted or not, the "threadid" field value provides an indicator of the thread number on which debug engine 434 is executing, and the "noderank" field value provides a rank of the node on which debug engine 434 is executing in the distributed environment.

In an operation 908, the created initial packet is sent to middle tier instance 316 requesting a connection. Each debug engine 434 has its own unshared TCP/IP connection with middle tier instance 316. One TCP/IP port can support many socket connections. For example, web traffic from REST API calls typically all go through port 80. Even though there is just one port, the webserver can support many simultaneous connections. Each thread on each node, for a given program, opens its own socket connection with middle tier instance 316 on the same port specified in the host/port/token option string that is unique for each user's debugging session. While the ports are shared across many nodes/threads in one program, they are not shared across multiple users' debugging sessions. In the illustrative embodiment, a multiplexer can be setup using TCP/IP between middle tier instance 316 and each debug engine 434.

In an operation 910, a confirmation response is received from middle tier instance 316 to establish the second connection between debug engine 434 and middle tier instance 316. When an authentication is unsuccessful, the confirmation response may indicate that an error occurred that may cause execution of modified software to debug 414 to stop and trigger the sending of the indicator that processing is complete to workspace server 106.

In an operation 912, the debug command is received from middle tier instance 316 using the established second connection.

In an operation 916, the debug command is processed.

In an operation 918, a determination is made concerning whether or not execution should proceed. When execution should proceed, processing continues in operation 920. When execution should not proceed, processing continues in an operation 924.

In operation 920, program execution proceeds while maintaining the call stack. For example, frames are pushed onto the call stack record when program execution enters a function or subroutine, and frames popped off the call stack record when program execution exits a function or subroutine.

In an operation 922, a determination is made concerning whether or not execution should proceed. When execution should proceed, processing continues in operation 920. When execution should not proceed, processing continues in operation 924. Stop conditions such as a break point being reached is checked after execution of each program line.

In operation 924, a response is sent to middle tier instance 316.

Processing continues in operation 912 when a next debug command is received. Processing may continue in operation 912 until the end of execution of modified software to debug 414, the debug command indicates to stop debug processing, or an error occurs from which execution cannot be restarted. When processing is stopped, the response may indicate that an error occurred, execution successfully completed, or execution was stopped based on the debug command any of which may be the indicator that processing is complete.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a first computing device cause the first computing device to:

receive a connection request from a debug user interface (UI) by a middle tier instance executing on the first computing device through a first predefined computer port of the first computing device, wherein the connection request includes authentication data;

connect to the debug UI when an authentication is successful using the included authentication data;

receive a connection data request from the debug UI by the middle tier instance, wherein the connection data request indicates the connection is for a debug engine executing on a second computing device different from the first computing device;

send connection data for the debug engine from the middle tier instance to the debug UI, wherein the connection data is provided to the debug engine from the debug UI, wherein the connection data includes a second predefined computer port of the first computing device and a security token, wherein the second predefined computer port is different than the first predefined computer port;

(A) receive an initial packet by the middle tier instance from the debug engine through the second predefined computer port of the first computing device, wherein the initial packet includes the security token;

(B) evaluate, by the middle tier instance, the security token included in the received initial packet;

(C) when the evaluated security token matches the security token included in the sent connection data, define, by the middle tier instance, a unique engine identifier for the debug engine;

send a notification from the middle tier instance to the debug engine confirming a successful connection; and send an engine connection confirmation from the middle tier instance to the debug UI indicating that a connection with the debug engine has been established and including the unique engine identifier for the debug engine;

(D) repeat (A) to (C) with each debug engine of a plurality of debug engines as the debug engine;
(E) receive a debug command from the debug UI by the middle tier instance, wherein the debug command includes a debug action to perform by the debug engine; and
(F) send the debug command to the debug engine to debug a software application as it is executing on the second computing device.

2. The non-transitory computer-readable medium of claim 1, wherein the debug UI is executing on a third computing device different from the first computing device and the second computing device.

3. The non-transitory computer-readable medium of claim 1, wherein the debug UI is executing on the first computing device.

4. The non-transitory computer-readable medium of claim 1, wherein each debug engine of a first subset of debug engines of the plurality of debug engines is executing on a different thread of the second computing device.

5. The non-transitory computer-readable medium of claim 4, wherein the second computing device is one of a plurality of second computing devices, wherein each debug engine of a second subset of debug engines of the plurality of debug engines is executing on a different second computing device of the plurality of second computing devices.

6. The non-transitory computer-readable medium of claim 1, wherein the second computing device is one of a plurality of second computing devices, wherein each debug engine of a subset of debug engines of the plurality of debug engines is executing on a different second computing device of the plurality of second computing devices.

7. The non-transitory computer-readable medium of claim 1, wherein the first predefined computer port and the second predefined computer port are transmission control protocol/internet protocol port numbers.

8. The non-transitory computer-readable medium of claim 1, wherein the connection data further includes a hostname of the middle tier instance.

9. The non-transitory computer-readable medium of claim 1, wherein the initial packet further includes a language of the software application.

10. The non-transitory computer-readable medium of claim 1, wherein the initial packet further includes an engine version number of the debug engine.

11. The non-transitory computer-readable medium of claim 1, wherein the initial packet further includes a list of variable scopes, wherein each variable scope defines a scope for one or more variables used by the software application.

12. The non-transitory computer-readable medium of claim 11, wherein the initial packet further includes a default scope selected from the list of variable scopes, wherein the default scope is used by the debug UI when the scope for a variable is not provided by the debug engine.

13. The non-transitory computer-readable medium of claim 1, wherein the debug UI is a graphical UI configured to receive the debug command from a user of the debug UI and to present a debug status to the user.

14. The non-transitory computer-readable medium of claim 1, wherein the debug command includes the engine identifier for a specific debug engine of the plurality of debug engines, wherein the engine identifier is removed from the debug command before the debug command is sent to the debug engine.

15. The non-transitory computer-readable medium of claim 1, wherein, when the debug command does not include the engine identifier for a specific debug engine of the plurality of debug engines, the debug command is sent to a current debug engine identified by the engine identifier associated with a current environment level.

16. The non-transitory computer-readable medium of claim 1, wherein each debug engine is a co-process executing within the software application.

17. The non-transitory computer-readable medium of claim 1, wherein the computer-readable instructions further cause the first computing device to:
(G) receive a poll request from the debug UI by the middle tier instance, wherein the poll request includes a request for a response to the debug command;
(H) receive a response to the sent debug command from the debug engine by the middle tier instance; and
(I) in response to the received poll request, send the received response from the middle tier instance to the debug UI.

18. The non-transitory computer-readable medium of claim 17, wherein the computer-readable instructions further cause the first computing device to repeat (E) to (I) until debug processing of the software application is stopped.

19. The non-transitory computer-readable medium of claim 17, wherein the received response is modified before the response is sent to the debug UI.

20. The non-transitory computer-readable medium of claim 17, wherein the received response includes a cumulative execution time since the debug command indicated an execution halt.

21. The non-transitory computer-readable medium of claim 20, wherein the debug command indicates to proceed with execution of the software application.

22. The non-transitory computer-readable medium of claim 1, wherein the debug command is sent from a thread created to wait for a response from the debug engine.

23. The non-transitory computer-readable medium of claim 1, wherein the connection data is included with the software application.

24. A first computing device comprising:
a processor; and
a computer-readable medium operably coupled to the processor, the computer-readable medium having computer-readable instructions stored thereon that, when executed by the processor, cause the first computing device to
receive a connection request from a debug user interface (UI) by a middle tier instance executing on the first computing device through a first predefined computer port of the first computing device, wherein the connection request includes authentication data;
connect to the debug UI when an authentication is successful using the included authentication data;
receive a connection data request from the debug UI by the middle tier instance, wherein the connection data request indicates the connection is for a debug engine executing on a second computing device different from the first computing device;
send connection data for the debug engine from the middle tier instance to the debug UI, wherein the connection data is provided to the debug engine from the debug UI, wherein the connection data includes a second predefined computer port of the first computing device and a security token, wherein the second predefined computer port is different than the first predefined computer port;
(A) receive an initial packet by the middle tier instance from the debug engine through the second predefined computer port of the first computing device, wherein the initial packet includes the security token;

(B) evaluate, by the middle tier instance, the security token included in the received initial packet;

(C) when the evaluated security token matches the security token included in the sent connection data,
define, by the middle tier instance, a unique engine identifier for the debug engine;
send a notification from the middle tier instance to the debug engine confirming a successful connection; and
send an engine connection confirmation from the middle tier instance to the debug UI indicating that a connection with the debug engine has been established and including the unique engine identifier for the debug engine;

(D) repeat (A) to (C) with each debug engine of a plurality of debug engines as the debug engine;

(E) receive a debug command from the debug UI by the middle tier instance, wherein the debug command includes a debug action to perform by the debug engine; and (F) send the debug command to the debug engine to debug a software application as it is executing on the second computing device.

25. A method for a debug process of a distributed application, the method comprising:
receiving a connection request from a debug user interface (UI) by a middle tier instance executing on the first computing device through a first predefined computer port of the first computing device, wherein the connection request includes authentication data;
connecting, by the middle tier instance, to the debug UI when an authentication is successful using the included authentication data;
receiving a connection data request from the debug UI by the middle tier instance, wherein the connection data request indicates the connection is for a debug engine executing on a second computing device different from the first computing device;
sending connection data for the debug engine from the middle tier instance to the debug UI, wherein the connection data is provided to the debug engine from the debug UI, wherein the connection data includes a second predefined computer port of the first computing device and a security token, wherein the second predefined computer port is different than the first predefined computer port;

(A) receiving an initial packet by the middle tier instance from the debug engine through the second predefined computer port of the first computing device, wherein the initial packet includes the security token;

(B) evaluating, by the middle tier instance, the security token included in the received initial packet;

(C) when the evaluated security token matches the security token included in the sent connection data,
defining, by the middle tier instance, a unique engine identifier for the debug engine;
sending a notification from the middle tier instance to the debug engine confirming a successful connection; and
sending an engine connection confirmation from the middle tier instance to the debug UI indicating that a connection with the debug engine has been established and including the unique engine identifier for the debug engine;

(D) repeating, by the middle tier instance, (A) to (C) with each debug engine of a plurality of debug engines as the debug engine;

(E) receiving a debug command from the debug UI by the middle tier instance, wherein the debug command includes a debug action to perform by the debug engine; and (F) sending, by the middle tier instance, the debug command to the debug engine to debug a software application as it is executing on the second computing device.

26. The method of claim 25, wherein each debug engine of a first subset of debug engines of the plurality of debug engines is executing on a different thread of the second computing device.

27. The method of claim 25, wherein the second computing device is one of a plurality of second computing devices, wherein each debug engine of a subset of debug engines of the plurality of debug engines is executing on a different second computing device of the plurality of second computing devices.

28. The method of claim 25, wherein the first predefined computer port and the second predefined computer port are transmission control protocol/internet protocol port numbers.

29. The method of claim 25, wherein the connection data further includes a hostname of the middle tier instance.

30. The method of claim 25, wherein the connection data is included with the software application.

* * * * *

UNITED STATES PATENT AND TRADEMARK OFFICE
CERTIFICATE OF CORRECTION

PATENT NO. : 10,691,581 B1
APPLICATION NO. : 16/802781
DATED : June 23, 2020
INVENTOR(S) : Michael Stephen Whitcher et al.

Page 1 of 1

It is certified that error appears in the above-identified patent and that said Letters Patent is hereby corrected as shown below:

In the Specification

<u>Column 26, Line 9:</u>
Delete the phrase "The debug action may be a "sets" command"
And replace with --The debug action may be a "setv" command--.

<u>Column 26, Lines 11-12:</u>
Delete the phrase "The command syntax may be "sets -v <varname> -n <value> -l <envlevel>"."
And replace with --The command syntax may be "setv -v <varname> -n <value> -l <envlevel>".--.

<u>Column 36, Line 45:</u>
Delete the phrase ""scopes" : ["local", "system", "global" ],"
And replace with --"scopes" : ["local", "system", "global"],--.

Signed and Sealed this
Twenty-ninth Day of September, 2020

Andrei Iancu
*Director of the United States Patent and Trademark Office*